United States Patent
Wu

(10) Patent No.: US 12,041,653 B2
(45) Date of Patent: *Jul. 16, 2024

(54) METHOD AND DEVICE FOR WIRELESS COMMUNICATION ON AN UNLICENSED SPECTRUM

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/244,914

(22) Filed: Apr. 29, 2021

(65) Prior Publication Data

US 2021/0266956 A1     Aug. 26, 2021

Related U.S. Application Data

(63) Continuation of application No. 16/905,792, filed on Jun. 18, 2020, now Pat. No. 11,051,334, which is a
(Continued)

(51) Int. Cl.
*H04W 74/00* (2009.01)
*H04W 48/12* (2009.01)
(Continued)

(52) U.S. Cl.
CPC ......... *H04W 74/006* (2013.01); *H04W 48/12* (2013.01); *H04W 48/16* (2013.01); *H04W 72/542* (2023.01)

(58) Field of Classification Search
CPC ... H04W 74/006; H04W 48/12; H04W 48/16; H04W 72/085
See application file for complete search history.

(56) References Cited

U.S. PATENT DOCUMENTS 11,051,334 B2 * 6/2021 Wu ........................ H04W 16/14
2014/0293907 A1 * 10/2014 Lee ........................ H04L 5/0096
370/329
(Continued)

FOREIGN PATENT DOCUMENTS

CN     106385711 A     2/2017
CN     107667565 A     2/2018
(Continued)

OTHER PUBLICATIONS

Corrected Notice of Allowability issued May 25, 2021 of U.S. Appl. No. 16/905,792, filed Jun. 18, 2020.
(Continued)

*Primary Examiner* — Siming Liu
(74) *Attorney, Agent, or Firm* — PERKINS COIE LLP

(57) ABSTRACT

Embodiments of this application include at least one method or device for a wireless communication on an unlicensed spectrum, which can improve communication flexibility on the unlicensed spectrum. A network device can receive first indication information sent by a first terminal device in a first transmission burst. The first indication information indicates a channel occupancy time (COT) initiated by the first terminal. The network device can perform a downlink transmission within a second transmission burst in accordance with the first indication information. The first indication information is transmitted within the first transmission burst, where the first transmission burst and the second transmission burst are transmitted within the COT and channel(s) transmitted in the second transmission burst do not comprise a unicast physical downlink shared channel (PDSCH) and a duration of the second transmission burst is less than or equal to a preset duration.

22 Claims, 6 Drawing Sheets

Related U.S. Application Data continuation of application No. PCT/CN2019/072358, filed on Jan. 18, 2019.

(51) Int. Cl.
*H04W 48/16* (2009.01)
*H04W 72/542* (2023.01)

(56) References Cited

U.S. PATENT DOCUMENTS

| | | | |
|---|---|---|---|
| 2017/0117997 A1 | 4/2017 | Park et al. | |
| 2018/0049060 A1* | 2/2018 | Fujishiro | H04W 72/042 |
| 2018/0054822 A1* | 2/2018 | Kim | H04W 72/085 |
| 2018/0124789 A1* | 5/2018 | Yerramalli | H04B 1/713 |
| 2020/0053637 A1* | 2/2020 | Tsai | H04L 5/001 |
| 2020/0383132 A1* | 12/2020 | Yang | H04W 72/0453 |

FOREIGN PATENT DOCUMENTS

| | | | | |
|---|---|---|---|---|
| CN | 107743695 A | 2/2018 | | |
| CN | 107889114 A | 4/2018 | | |
| CN | 108347307 A | 7/2018 | | |
| CN | 109156035 A | 1/2019 | | |
| CN | 109196944 A | 1/2019 | | |
| KR | 20170052473 A | 5/2017 | | |
| RU | 2651811 C1 | 4/2018 | | |
| WO | 2017160343 A1 | 9/2017 | | |
| WO | 2017180179 A1 | 10/2017 | | |
| WO | 2018073792 A1 | 4/2018 | | |
| WO | 2018075745 A1 | 4/2018 | | |
| WO | 2018184022 A1 | 10/2018 | | |
| WO | WO-2018184022 A1 * | 10/2018 | | H04L 5/0044 |
| WO | 2020146833 A1 | 7/2020 | | |
| WO | WO-2020146833 A1 * | 7/2020 | | H04L 5/001 |

OTHER PUBLICATIONS

InterDigital Inc. "Configured Grant Enhancements in NR-U" R1-1813223; 3GPP TSG RAN WG1 Meeting #95; Nov. 2018. 5 pages.
IPA, Examination Report No. 1 for Australian Patent Application No. 2019422210. Mail Date: Apr. 30, 2021. 5 pages.
KIPO, Notification of Reason for Refusal for Korean Patent Application No. 10-2020-7032018. Mail Date: Jul. 20, 2021. 13 pages with English translation.
LG Electronics, "Discussion on AUL-initiated COT sharing for LAA" R1-1808464; 3GPP TSG RAN WG1 Meeting #94, Aug. 2018, 4 pages.
MediaTek Inc. "Discussion on NR-U configured grant" 3GPP TSG RAN WG1 Meeting #95; Nov. 2018. 3 pages.
OPPO, "On configured grant for NR-U" R1-1900275; 3GPP TSG RAN WG1 Ad-Hoc Meeting 1901; Jan. 2019. 3 pages.
EPO, Extended European Search Report for European Patent Application No. 19910757.4. Mailing Date: Mar. 30, 2021. 11 pages.
International Application No. PCT/CN2019/072358, International search report, mailed on Sep. 26, 2019, 2 pages.
Non-Final Office Action issued Sep. 18, 2020 of U.S. Appl. No. 16/905,792, filed Jun. 18, 2020.
Notice of Allowance issued Jan. 29, 2021 of U.S. Appl. No. 16/905,792, filed Jun. 18, 2020.
Oppo, "Harq enhancements for NR-U", 3GPP TSG RAN WG1 Meeting #94bis, R1-1810960, Oct. 8 - 12, 2018.
Qualcomm Inc. "Channel Access for Autonomous UL Access" 3GPP Draft; R1-1720406; Nov. 18, 2017.
Qualcomm Inc. "Enhancement to configured grants in NR unlicensed" 3GPP Draft; R1-1813416; Nov. 11, 2018.
R1-1900873 Qualcomm RAN1#AH1901 meeting minutes published date : Jan. 12, 2019.
Samsung "Enhancements on configured grant for NR-U" 3GPP Draft; R1-1812980, Nov. 11, 2018.
Sharp "HARQ enhancement for NR unlicensed operation" 3GPP Draft; R1-1813207; Nov. 16, 2018.
Sharp, "HARQ enhancement for NR unlicensed operation", 3GPP TSG RAN WG1 Meeting #95, R1-1813207, Nov. 12-16, 2018.
Spreadtrum Communications, "Discussion on HARQ enhancements in Nr-U", 3GPP TSG RAN WG1 Meeting #95, R1-1813070, Nov. 12-16, 2018.
Supplemental Notice of Allowability issued Apr. 23, 2021 of U.S. Appl. No. 16/905,792, filed Jun. 18, 2020.
Examination Report for European Application No. 19910757.4 issued Feb. 16, 2022. 6 pages.
Intel Corporation "Enhancements to configured grants for NR-unlicensed" R1-1900473; 3GPP TSG RAN WG1 Meeting AH 1901; Taipei, Taiwan, Jan. 21-25, 2019. 8 pages.
Notice of Allowance for Korean Application No. 10-2020-7032018 issued Jan. 25, 2022. 3 pages with English translation.
Notice of Reasons for Refusal for Japanese Application No. 2020-564382 issued Jan. 28, 2022. 12 pages with English translation.
NTT Docomo, Inc. "Channel access procedures for NR-U" R1-1900953; 3GPP TSG RAN WG1 Ad-Hoc Meeting 1901; Jan. 21-25, 2019; Taipei. 3 pages.
Office Action for Russian Application No. 2020136672 issued Jan. 31, 2022. 13 pages with English translation.
Qualcomm Incorporated "Channel Access for Autonomous UL Access" R1-1718124; 3GPP TSG RAN WG1 #90bis; Oct. 9-13, 2017; Prague, Czech; 4 pages.
Qualcomm Incorporated "Enhancements to configured grants in NR unlicensed" R1-1900876; 3GPP TSG RAN WG1 Meeting #AH1901; Taipei, Taiwan; Jan. 21-25, 2019. 10 pages.
Sony "Considerations on DL Signals and Channels for NR unlicensed operation" R1-1900362; 3GPP TSG RAN WG1 Ad-Hoc Meeting 1901; Taipei, Taiwan, Jan. 21-25, 2019. 4 pages.
Examination Report for Indian Application No. 202027044391 issued Dec. 6, 2021. 7 pages with English translation.
Examiner's Report for Canadian Application No. 3,097,216 issued Nov. 3, 2021. 6 pages.
Notice of Acceptance for Australian Patent Application No. 2019422210 issued Oct. 22, 2021. 3 pages.
Notice of Preliminary Rejection of the Korean application No. 10-2022-7010865, issued on May 16, 2022. 10 pages with English Translation.
Examination Report for European Application No. 19910757.4 issued Feb. 24, 2023. 5 pages.
Second Office Action for Chinese Application No. 202010918264.0 issued Apr. 27, 2023. 9 pages with English translation.
Examination Report for European Application No. 19910757.4 Issued Aug. 8, 2023, 4 Pages.
Notice of Allowance for Chinese Application No. 202010918264.0 Issued Jun. 30, 2023, 7 Pages with English Translation.
Ericsson "Future compatibility for operating NR in unlicensed spectrum" R2-168490 3GPP tsg_ran\WG2 #96 Reno, Nevada, USA, Nov. 14-18, 2016. 5 Pages.
First Substantive Examination Requirement issued for Mexican application No. MX/a/2020/011902, 11 pages with English translation.
Examination Report for European Application No. 19910757.4 issued Sep. 16, 2022. 5 pages.
First Office Action for Chinese Application No. 202010918264.0 issued Nov. 1, 2022. 14 pages with English translation.
Huawei et al. "Transmission with configured grant in NR unlicensed band" R1-1808064; 3GPP TSG RAN WG1 Meeting #94; Gothenburg, Sweden; Aug. 20-24, 2018. 7 pages.

* cited by examiner

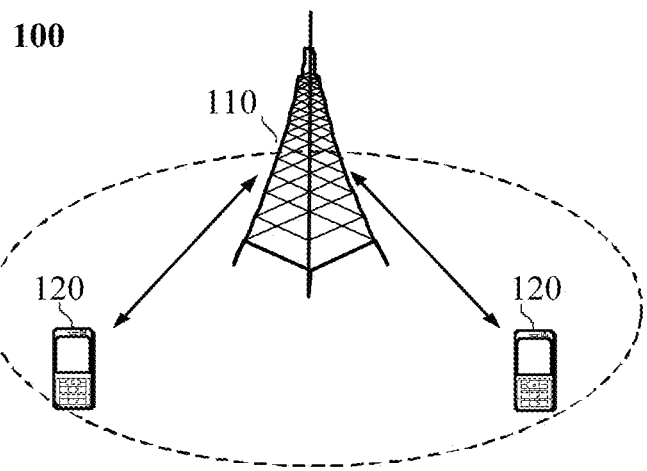
FIG. 1
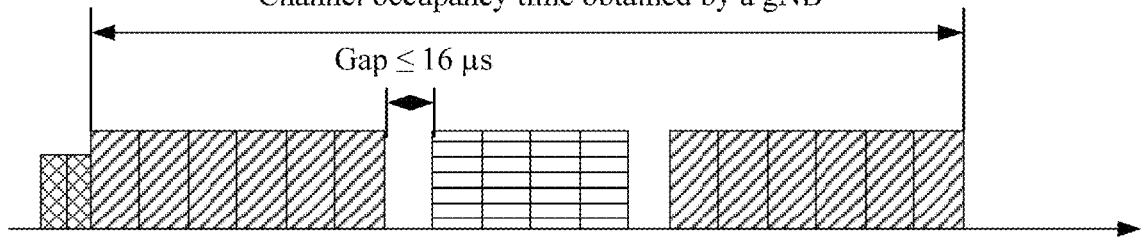
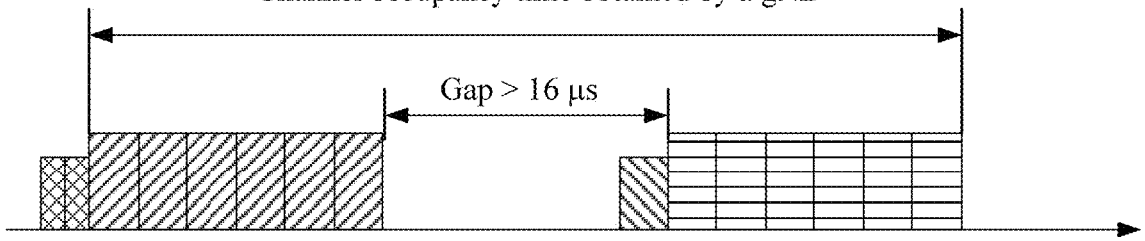
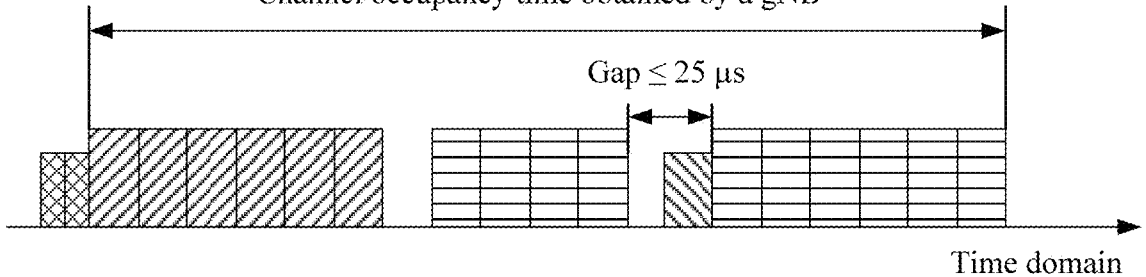
FIG. 2

400

Perform channel detection in first detection duration on an unlicensed spectrum, where the first detection duration is greater than 16 microseconds and is less than or equal to 25 microseconds, the first detection duration includes at least one detection slot, and the detection slot is located at a head end or a tail end of the first detection duration — 410

FIG. 9

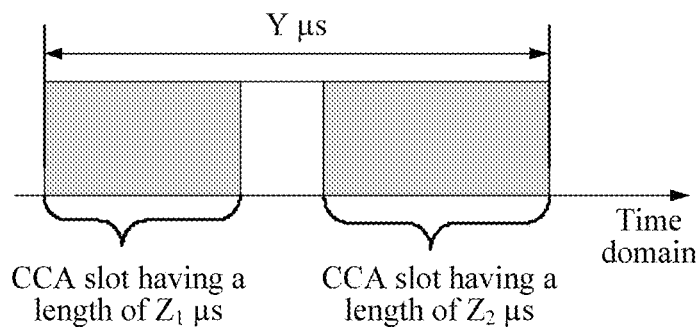

CCA slot having a length of $Z_1$ μs    CCA slot having a length of $Z_2$ μs

FIG. 10

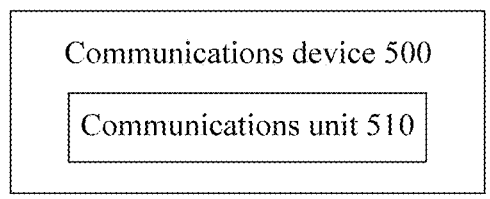

FIG. 11

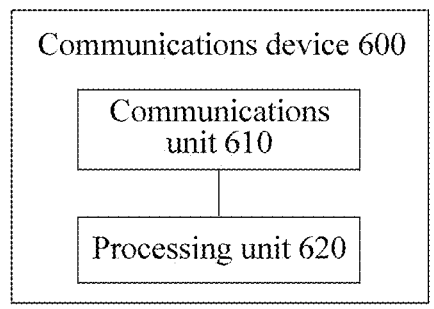

FIG. 12

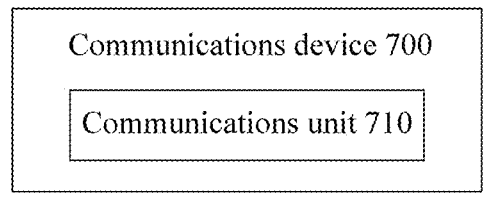

FIG. 13

METHOD AND DEVICE FOR WIRELESS COMMUNICATION ON AN UNLICENSED SPECTRUM

CROSS-REFERENCE TO RELATED APPLICATION

This application is a continuation application of the U.S. application Ser. No. 16/905,792, filed on Jun. 18, 2020, which is a continuation of PCT Application No. PCT/CN2019/072358 filed on Jan. 18, 2019. The entire contents of above identified applications are hereby incorporated by reference.

TECHNICAL FIELD

Embodiments of this application relate to the field of communications technologies, and specifically to a wireless communication method and a device for an unlicensed spectrum.

BACKGROUND

An unlicensed spectrum is a spectrum that may be used for communication of a radio device and that is allocated by a nation or a region. The spectrum is usually considered as a shared spectrum. That is to say, when satisfying a regulatory requirement set by the nation or the region on the spectrum, communications devices in different communications systems may use the spectrum, and may not need to apply for a dedicated spectrum license to a government.

With development of communications technologies, a flexibility requirement for communications is increasingly high.

How to improve communication flexibility in an aspect of unlicensed spectrum communication is one problem to be resolved urgently.

SUMMARY

Embodiments of this application provide a wireless communication method and a device for an unlicensed spectrum, to improve communication flexibility in an aspect of unlicensed spectrum communication.

According to a first aspect, a communication method for an unlicensed spectrum is provided. The method includes: sending, by a first terminal device, first indication information to a network device through a first transmission burst in a channel occupancy time (COT) obtained by the first terminal device, where the COT includes a second transmission burst and a third transmission burst, and the first indication information is used by the network device to determine the second transmission burst in the COT.

In the solution, a COT obtained by a first terminal device may include a first transmission burst, a second transmission burst and a third transmission burst, and the first terminal device may send indication information by using the first transmission burst, so that a network device determines the second transmission burst, and may share the second transmission burst. In addition, the third transmission burst is further included, so that a transmission resource in the COT is flexibly used, to avoid transmission resource waste and maximize transmission resource utilization.

According to a second aspect, a wireless communication method for an unlicensed spectrum is provided. The method includes: sending, by a first device, first indication information to a second device through a first transmission burst in a channel occupancy time (COT) obtained by the first device, where the first indication information is used for determining at least one of the following information: whether the first device shares a resource in the COT, a channel access scheme of a second transmission burst in the COT, an ending location of the first transmission burst, a starting location of the second transmission burst, a length of the second transmission burst, an ending location or a remaining length of the COT, a QCL relationship between channels or signals transmitted on the first transmission burst, a QCL relationship between channels or signals to be transmitted on the second transmission burst, and a gap between the ending location of the first transmission burst and the starting location of the second transmission burst.

In the solution, a first device sends first indication information to a second device through a first transmission burst in a channel occupancy time (COT) obtained by the first device, where the first indication information is used for determining at least one of the following information: whether the first device shares a resource in the COT, a channel access scheme of a second transmission burst in the COT, an ending location of the first transmission burst, a starting location of the second transmission burst, a length of the second transmission burst, an ending location or a remaining length of the COT, a QCL relationship between channels or signals transmitted on the first transmission burst, a QCL relationship between channels or signals to be transmitted on the second transmission burst, and a gap between the ending location of the first transmission burst and the starting location of the second transmission burst. The first device may implement transmission on the second transmission burst through the first indication information, so that a transmission resource in the COT is flexibly used, to avoid transmission resource waste and maximize transmission resource utilization.

According to a third aspect, a channel detection method on an unlicensed spectrum is provided. The method includes: performing channel detection in first detection duration on an unlicensed spectrum, where the first detection duration is greater than 16 microseconds and is less than or equal to 25 microseconds, the first detection duration includes at least one detection slot, and the detection slot is located at a head end or a tail end of the first detection duration.

In the solution, when the first detection duration is greater than 16 microseconds and less than or equal to 25 microseconds, detection may be performed in at least one detection slot at a head end or a tail end of the first detection duration, to implement detection in the detection duration greater than 16 microseconds and less than or equal to 25 microseconds.

According to a fourth aspect, a wireless communication method for an unlicensed spectrum is provided. The method includes: receiving, by a network device, first indication information sent by a first terminal device, where the first indication information is transmitted on a first transmission burst in a channel occupancy time (COT) obtained by the first terminal device, where the COT includes a second transmission burst and a third transmission burst, and the first indication information is used by the network device to determine the second transmission burst in the COT.

According to a fifth aspect, a wireless communication method for an unlicensed spectrum is provided. The method includes: receiving, by a second device, first indication information sent by a first device, where the first indication information is sent by the first device through a first transmission burst in a channel occupancy time (COT) obtained by the first device, where the first indication information is used for determining at least one of the following information: whether the first device shares a resource in the COT, a channel access scheme of a second transmission burst in the COT, an ending location of the first transmission burst, a starting location of the second transmission burst, a length of the second transmission burst, an ending location or a remaining length of the COT, a QCL relationship between channels or signals transmitted on the first transmission burst, a QCL relationship between channels or signals to be transmitted on the second transmission burst, and a gap between the ending location of the first transmission burst and the starting location of the second transmission burst.

According to a sixth aspect, a communications device is provided. The communications device is configured to perform the foregoing method in any one of the first aspect to the fifth aspect.

Specifically, the communications device includes a functional module configured to perform the foregoing method in any one of the first aspect to the fifth aspect.

According to a seventh aspect, a communications device is provided. The communications device includes a processor and a memory. The memory is configured to store a computer program, and the processor is configured to invoke and run the computer program stored in the memory, to perform the foregoing method in any one of the first aspect to the fifth aspect.

According to an eighth aspect, a chip is provided. The chip is configured to implement the foregoing method in any one of the first aspect to the fifth aspect.

Specifically, the chip includes a processor, configured to invoke and run a computer program from a memory, to enable a device in which the chip is installed to perform the foregoing method in any one of the first aspect to the fifth aspect.

A ninth aspect provides a computer readable storage medium, configured to store a computer program, where the computer program enables a computer to perform the foregoing method in any one of the first aspect to the fifth aspect.

According to a tenth aspect, a computer program product is provided, and includes a computer program instruction, where the computer program instruction enables a computer to perform the foregoing method in any one of the first aspect to the fifth aspect.

According to an eleventh aspect, a computer program is provided. When the computer program is run on a computer, the computer is enabled to perform the foregoing method in any one of the first aspect to the fifth aspect or each implementation of any aspect.

BRIEF DESCRIPTION OF THE DRAWINGS

FIG. 1 is a schematic diagram of a communications system architecture according to an embodiment of this application.

FIG. 2 is a schematic diagram of a communication process in a channel occupancy time (COT) according to an embodiment of this application.

FIG. 9 is a schematic flowchart of a wireless communication method for an unlicensed spectrum according to an embodiment of this application.

FIG. 10 is a schematic diagram of channel detection duration according to an embodiment of this application.

FIG. 11 is a schematic block diagram of a communications device according to an embodiment of this application.

FIG. 12 is a schematic block diagram of a communications device according to an embodiment of this application.

FIG. 13 is a schematic block diagram of a communications device according to an embodiment of this application.

DETAILED DESCRIPTION

Figure 3:
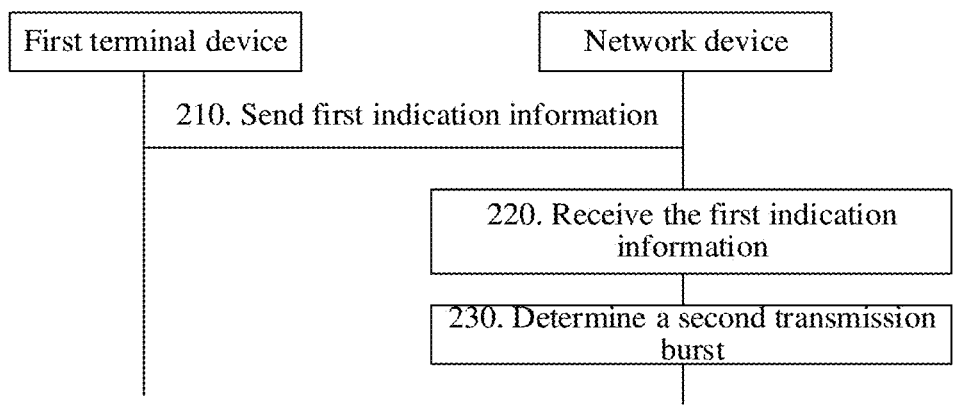
FIG. 3 is a schematic flowchart of a communication method for an unlicensed spectrum according to an embodiment of this application.

The technical solutions of the embodiments of this application will be described in the following with reference to the accompanying drawings. It is obvious that the embodiments to be described are a part rather than all of the embodiments of this application. All other embodiments obtained by persons of ordinary skill in the art based on the embodiments of the present invention without making creative efforts shall fall within the protection scope of the present invention.

The technical solutions of the embodiments of this application may be applied to various communications systems, for example, a Global System for Mobile Communications (GSM) system, a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, an LTE time division duplex (TDD), an advanced Long Term Evolution (LTE-A) system, a New Radio (NR) system, an evolved system of an NR system, an LTE-based access to unlicensed spectrum (LTE-U) system, an NR-based access to unlicensed spectrum (NR-U) system, a Universal Mobile Telecommunications System (UMTS), a Worldwide Interoperability for Microwave Access (WiMAX) communications system, a wireless local area network (WLAN), Wireless Fidelity (Wi-Fi), a next-generation communications system or another communications system.

Usually, a quantity of connections supported by a conventional communications system is limited, and is also easily implemented. However, with development of communications technologies, a mobile communications system not only supports conventional communication, but also supports, for example, device to device (D2D) communication, machine to machine (M2M) communication, machine type communication (MTC), and vehicle to vehicle (V2V)

communication, and the embodiments of this application may also be applied to these communications systems.

For example, a communications system 100 to which the embodiments of this application are applied is shown in FIG. 1. The communications system 100 may include a network device 110, and the network device 110 may be a device communicating with a terminal device 120 (or referred to as a communications terminal or a terminal). The network device 110 may provide communications coverage to a particular geographic area, and may communicate with a terminal device located within the coverage area. Optionally, the network device 110 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a mobile switching center, a relay station, an access point, an in-vehicle device, a wearable device, a hub, a switch, a network bridge, a router, a network side device in a 5G network, a network device in a future evolved public land mobile network (PLMN) or the like.

The communications system 100 further includes at least one terminal device 120 located within the coverage range of the network device 110. As used herein, a "terminal device" includes, but is not limited to, a device that is configured to receive/transmit communication signals via a wired line connection, such as via a public-switched telephone network (PSTN), a digital subscriber line (DSL), a digital cable, a direct cable connection, and/or another data connection/network, and/or via a wireless interface for, for example, a cellular network, a wireless local area network (WLAN), a digital television network such as a DVB-H network, a satellite network, an AM/FM broadcast transmitter, and/or another terminal device; and/or an Internet of Things (IoT) device. The terminal device configured to communicate through a wireless interface may be referred to as a "wireless communications terminal", a "wireless terminal" or a "mobile terminal". Examples of mobile terminals include, but are not limited to, satellite or cellular telephones, personal communication system (PCS) terminals that can combine cellular radio telephone as well as data processing, faxing, and data communication capabilities, PDAs that may include radio telephones, pagers, Internet/Intranet access, web browsers, notepads, calendars, and/or global positioning system (GPS) receivers, and conventional laptop and/or palmtop receivers or other electronic devices including radio telephone transceivers. The terminal device may be an access terminal, user equipment (UE), a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN or the like.

Optionally, the terminal devices 120 may perform device to device (D2D) communication with each other.

Optionally, the 5G system or 5G network may be further referred to as a New Radio (NR) system or NR network.

FIG. 1 shows one network device and two terminal devices as an example. Optionally, the communications system 100 may include a plurality of network devices and coverage of each network device may include another quantity of terminal devices. This is not limited in this embodiment of this application.

Optionally, the communications system 100 may further include other network entities such as a network controller and a mobility management entity. This is not limited in this embodiment of this application.

It should be understood that, a device having a communication function in a network/system in the embodiments of this application may be referred to as a communications device. Using the communications system 100 shown in FIG. 1 as an example, a communications device may include a network device 110 and a terminal device 120 that have a communication function, the network device 110 and the terminal device 120 may be the specific devices described above, and details are not described herein again. The communications device may further include other devices in the communications system 100, for example, other network entities such as a network controller and a mobility management entity. This is not limited in this embodiment of this application.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

A method of the embodiments of this application may be applied to unlicensed spectrum communication, and may also be applied to another communication scenario such as a licensed spectrum communication scenario.

An unlicensed spectrum is a spectrum that may be used for communication of a radio device and that is allocated by a nation or a region. The spectrum may be considered as a shared spectrum. That is to say, as long as communications devices in different communications systems satisfy a regulatory requirement set by the nation or the region on the spectrum, the communications devices may use the spectrum, and may not apply for a dedicated spectrum license to a government. To enable communications systems performing wireless communication by using an unlicensed spectrum to coexist on the spectrum friendlily, when performing communication on the unlicensed spectrum, a communications device may follow a principle of Listen Before Talk (LBT). That is to say, before performing signal transmission on a channel of the unlicensed spectrum, the communications device needs to first perform channel snooping (or referred to as channel detection). Only when a channel snooping result is that the channel is idle, the communications device can perform signal transmission. If a result of channel snooping performed by the communications device on the unlicensed spectrum is that the channel is busy, the communications device cannot perform signal transmission. Optionally, a bandwidth of LBT is 20 MHz or integer times 20 MHz.

To understand this application more clearly, concepts applied to unlicensed spectrum communication are described below.

A maximum channel occupancy time (MCOT) may refer to maximum duration in which a channel of an unlicensed spectrum is allowed to be used to perform signal transmission after LBT succeeds, and there are different MCOTs in different channel access schemes. A maximum value of the MCOT may be, for example, 10 ms. It should be understood that, the MCOT is the time occupied by signal transmission.

A channel occupancy time (COT) may refer to duration in which signal transmission is performed by using a channel of an unlicensed spectrum after LBT succeeds, and channels occupied by signals in the duration may be inconsecutive. One COT is not allowed to exceed, for example, 20 ms at most, and duration occupied by signal transmission in the COT within does not exceed the MCOT.

A gNB's channel occupancy time (gNB-initiated COT) may also be referred to as a gNB-initiated COT, and refers to one channel occupancy time obtained by a gNB after LBT succeeds. In addition to being used for downlink transmission, the gNB's channel occupancy time may also be used by UE to perform uplink transmission when a particular condition is satisfied.

A UE's channel occupancy time (UE-initiated COT) may also be referred to as a UE-initiated COT, and refers to one channel occupancy time obtained by UE after LBT succeeds.

A downlink (DL) transmission burst (DL transmission burst) refers to a group of downlink transmission (that is, including one or more times of downlink transmission) performed by a gNB, and the group of downlink transmission is consecutive transmission (that is, there is no gap between a plurality of times of downlink transmission); or there is a gap between the group of downlink transmission, but the gap is less than or equal to particular duration (for example, 16 μs). If a gap between two times of downlink transmission performed by the gNB is greater than the particular duration (for example, 16 μs), it may be considered that the two times of downlink transmission belong to two downlink transmission bursts.

An uplink (UL) transmission burst (UL transmission burst) refers to a group of uplink transmission (that is, including one or more times of uplink transmission) performed by UE, and the group of uplink transmission is consecutive transmission (that is, there is no gap between a plurality of times of uplink transmission); or there is a gap between the group of uplink transmission, but the gap is less than or equal to particular duration (for example, 16 μs). If a gap between two times of uplink transmission performed by the UE is greater than the particular duration (for example, 16 μs), it may be considered that the two times of uplink transmission belong to two uplink transmission bursts.

In this embodiment of this application, the communications device may perform an LBT operation by using a corresponding channel access scheme. For ease of understanding, several channel access schemes are introduced below.

Category-1 LBT (Cat-1 LBT): Transmission is performed immediately after a switching gap ends, that is, whether a channel is idle does not need to be detected, and the category-1 channel access scheme is applicable to transmission switching in one COT. The switching gap may not exceed particular duration such as 16 μs.

Category-2 LBT (Cat-2 LBT): It may be referred to as LBT without random backoff. If a channel is idle in a single detection time, signal transmission may be performed; and if the channel is occupied, signal transmission cannot be performed.

Category-3 LBT (Cat-3 LBT): It is LBT with random backoff based on a fixed contention window size (CWS). In this case, the communications device determines that the CWS is a CWp, where the CWp is a fixed value; the communications device generates a random number N according to the value of the CWp; and the communications device performs channel detection on an unlicensed spectrum, and may perform signal transmission after channel detection succeeds in all of N slots.

Category-4 LBT (Cat-4 LBT): It is LBT with random backoff based on a variable CWS. In this case, the communications device determines that the CWS is a CWp, where the CWp is a variable value; the communications device generates a random number N according to the value of the CWp; and the communications device performs channel detection on an unlicensed spectrum, and may perform signal transmission after channel detection succeeds in all of N slots.

It can be known from the above description that, a difference between Cat-3 LBT and Cat-4 LBT lies in whether the CWS is a fixed value or a variable value. Relatively preferred channel access schemes may be Cat-1 LBT, Cat-2 LBT and Cat-4 LBT.

Additionally, Cat-3 LBT and Cat-4 LBT may further differentiate between priorities of channel access schemes according to priorities of transmission services. That is to say, Cat-3 LBT and Cat-4 LBT may respectively have different channel access sub-schemes, and the different channel access sub-schemes may correspond to different service transmission priorities.

Channel access schemes applied to different transmission scenarios are different, and channel access schemes applied to different signals or channels are also different.

For example, when a gNB initiates a COT, Table 1 shows channel access schemes in different cases.

TABLE 1

| Target signal | Cat-2 LBT | Cat-4 LBT |
| --- | --- | --- |
| There is only a discovery reference signal (DRS) or a DRS and non-unicast data are multiplexed (for example, other system information (OSI), paging, or a random access response (RAR)) | If a duty cycle of a DRS ≤1/20, and a total length ≤1 ms, single-time LBT of 25 μs is used | If a duty cycle of a DRS >1/20, or a total length >1 ms |
| A DRS and unicast data are multiplexed | Usually not supported | Determine a channel access priority according to a service priority |
| Physical downlink control channel (PDCCH) and physical downlink shared channel (PDSCH) | Usually not supported | Determine a channel access priority according to a service priority |

Optionally, when a service includes data multiplexing transmission of a plurality of priorities, a channel access scheme or priority is determined according to data of a lowest priority of the plurality of priorities.

Optionally, non-unicast data may mean that corresponding HARQ-ACK information such as a PDSCH for transmitting OSI does not need to be fed back for the data. Unicast data may mean that corresponding HARQ-ACK information such as a unicast PDSCH needs to be fed back for the data.

For another example, when UE initiates a COT, Table 2 specifies channel access schemes in different cases.

TABLE 2

| | Cat-2 LBT | Cat-4 LBT |
| --- | --- | --- |
| Physical uplink shared channel (PUSCH) | Not supported, unless the PUSCH includes | Determine a channel access priority |

TABLE 2-continued

| | Cat-2 LBT | Cat-4 LBT |
|---|---|---|
| (at least including user plane data) | only uplink control information, for example, hybrid automatic repeat request-acknowledgement (HARQ-ACK), a scheduling request (SR), and channel state information (CSI) | according to a service priority |
| There is only a sounding reference signal (SRS) | Not supported | Highest channel access priority |
| There is only a random access channel (RACH) | Undetermined | Highest channel access priority |
| There is only a physical uplink control channel (PUCCH) | Undetermined | Highest channel access priority |

Optionally, after the gNB performs Cat-4 LBT and initiates a COT, a resource in the COT may be used by the UE to perform uplink transmission. For an uplink transmission burst occurring in the gNB's COT, if a gap between a starting location of the uplink transmission burst and an ending location of a downlink transmission burst is less than or equal to 16 µs, the UE may immediately perform the uplink transmission; if no downlink transmission burst follows the uplink transmission burst in the gNB's COT, the UE may perform Cat-2 LBT before transmission; and if a gap between any two times of neighboring transmission in the gNB's COT is less than or equal to 25 µs, the UE may perform Cat-2 LBT, for example, as shown in FIG. 2.

That is to say, the gNB may share a transmission burst in the COT with the terminal device, so that a transmission resource in the COT may be flexibly used, to avoid transmission resource waste and maximize transmission resource utilization. The embodiments of this application provide the following solution. In the solution, a terminal device may share a transmission burst in a COT with a network device. Details are introduced below.

FIG. 3 is a schematic flowchart of a wireless communication method 200 according to an embodiment of this application. The method 200 includes at least a part of the following content.

In 210, a first terminal device sends first indication information to a network device through a first transmission burst in a COT obtained by the first terminal device. The COT includes a second transmission burst and a third transmission burst, and the first indication information is used by the network device to determine the second transmission burst in the COT.

In 220, the network device receives the first indication information.

In 230, the network device determines the second transmission burst according to the first indication information.

Specifically, a COT obtained by a first terminal device may include a first transmission burst, a second transmission burst and a third transmission burst, and the first terminal device may send indication information by using the first transmission burst, so that a network device determines the second transmission burst, and may share the second transmission burst. In addition, the third transmission burst is further included, so that a transmission resource in the COT is flexibly used, to avoid transmission resource waste and maximize transmission resource utilization.

Optionally, a transmission burst in this embodiment of this application may be composed of a time frequency resource.

Transmission resource of the first transmission burst, the second transmission burst and the third transmission burst do not overlap with each other. In time domain, the second transmission burst may be later than the first transmission burst, and the third transmission burst may be later than the second transmission burst.

Certainly, in this embodiment of this application, a quantity of transmission bursts in the COT may be not limited to three, and there may alternatively be another quantity of transmission bursts.

When the COT has three transmission bursts, there may be two transition points. A transition point in this embodiment of this application may refer to a gap between a starting location of a downlink transmission burst and an ending location of an uplink transmission burst, or may refer to a gap between a starting location of an uplink transmission burst and an ending location of a downlink transmission burst, or may refer to a gap between a starting location of an uplink transmission burst and an ending location of an uplink transmission burst.

When a transition point in this embodiment of this application may refer to a gap between a starting location of a downlink transmission burst and an ending location of an uplink transmission burst, or a gap between a starting location of an uplink transmission burst and an ending location of a downlink transmission burst, a time interval of the gap does not need to satisfy a particular duration requirement.

When a transition point refers to a gap between a starting location of an uplink transmission burst and an ending location of an uplink transmission burst, if the two uplink transmission bursts are uplink transmission bursts of the same UE, a time interval of the gap may satisfy a particular duration requirement; or if the two uplink transmission bursts are uplink transmission bursts of different UEs, a time interval of the gap does not need to satisfy a particular duration requirement.

Optionally, a UE-initiated COT may include at most two transition points, namely, include at most three transmission bursts.

For example, when a second transmission burst in a UE-initiated COT includes a unicast PDSCH, the COT includes at most three transmission bursts.

Optionally, when a UE-initiated COT includes no unicast PDSCH, the COT may include more than three transmission bursts. For example, a COT initiated by UE 1 includes four transmission bursts, where a first transmission burst is used by the UE 1 to transmit a PUSCH, a second transmission burst is used by a gNB to send a channel or a signal of a high priority, a third transmission burst is used by the UE 1 to transmit a PUSCH, and a fourth transmission burst is used by UE 2 to transmit a PUSCH. The UE 1 and the UE 2 have a same QCL assumption.

Certainly, in this embodiment of this application, a UE-initiated COT may alternatively include a transition point, that is, the COT may not include the aforementioned third transmission burst.

In an implementation, when a UE-initiated COT includes a transition point, if a gap between an ending location of a first transmission burst and a starting location of a second transmission burst is less than or equal to 16 µs, the communications device may perform channel detection by using Cat-1 LBT, for example, perform transmission immediately after the gap ends.

In another implementation, when a UE-initiated COT includes a transition point, if a gap between an ending location of a first transmission burst and a starting location of a second transmission burst is greater than 16 μs and less than or equal to 25 μs, the communications device may perform channel detection by using Cat-2 LBT, and perform transmission after LBT succeeds.

In another implementation, when a UE-initiated COT includes a transition point, if a gap between an ending location of a first transmission burst and a starting location of a second transmission burst is greater than 25 μs, the communications device may perform channel detection by using Cat-2 LBT, and perform transmission after LBT succeeds.

Optionally, in this embodiment of this application, the second transmission burst may be a downlink transmission burst, and the third transmission burst may be an uplink transmission burst.

For example, the second transmission burst is a transmission burst transmitted by the network device to the first terminal device or a second terminal device. The third transmission burst is a transmission burst transmitted by the first terminal device or the second terminal device to the network device.

Optionally, the first terminal device and the second terminal device mentioned in this embodiment of this application have a same quasi-co-located (QCL) assumption.

Optionally, that the first terminal device and the second terminal device have a same quasi-co-located (QCL) assumption may be understood as: the first terminal device and the second terminal device have a same transmission configuration indicator-state (TCI-state); or a spatial QCL parameter in a first TCI-state of the first terminal device corresponds to a first reference signal and a spatial QCL parameter in a second TCI-state of the second terminal device also corresponds to the first reference signal; or a spatial QCL parameter in a first TCI-state of the first terminal device corresponds to a first reference signal, a spatial QCL parameter in a second TCI-state of the second terminal device corresponds to a second reference signal, and the first reference signal and the second reference signal are spatially quasi-co-located, or quasi-co-located with respect to a spatial Rx parameter; or a transmit beam of the first terminal device and a transmit beam of the second terminal device are the same; or a receive beam of the first terminal device and a receive beam of the second terminal device are the same.

Optionally, the spatial QCL parameter includes QCL-TypeD, namely, spatial Rx parameter.

Optionally, a beam (or referred to as a receive beam) used for receiving a signal may be understood as a spatial domain reception filter used for receiving a signal; and correspondingly, a beam (or referred to as a transmit beam) used for transmitting a signal may be understood as a spatial domain transmission filter used for transmitting a signal. For two signals sent or received by using a same spatial domain transmission or reception filter, the two signals may be quasi-co-located (QCL) with respect to a spatial Rx parameter, namely, transmit beams or receive beams are the same.

Optionally, in this embodiment of this application, in addition to carrying the first indication information, the first transmission burst may further include uplink data, for example, a physical uplink shared channel (PUSCH).

Optionally, a PUSCH sent on the first transmission burst may be a CG-PUSCH.

Specifically, a periodic PUSCH resource location may be pre-configured for the terminal device. When the terminal device has uplink data sent, a scheduling request may not need to be sent, and LBT (for example, Cat-4 LBT) is performed before the pre-configured PUSCH resource location. If LBT succeeds, a CG-PUSCH may be sent at the PUSCH resource location; or if LBT does not succeed, LBT may be performed at a next PUSCH resource location.

Optionally, a PUSCH sent on the first transmission burst may be a message 3 (Msg3) in a random access procedure.

Specifically, a resource of the PUSCH carrying the message 3 may be determined according to a random access response (RAR) in the random access procedure.

Optionally, the first indication information is carried in a PUSCH in a manner of associating uplink control information.

Optionally, in this embodiment of this application, in addition to carrying the first indication information, the first transmission burst may further include a preamble sequence, for example, a physical random access channel (PRACH).

For example, when the terminal device has a PRACH sending requirement, LBT (for example, Cat-4 LBT) is performed before a PRACH resource location. If LBT succeeds, a PRACH may be sent at the PRACH resource location; or if LBT does not succeed, LBT may be performed at a next PRACH resource location.

The PRACH resource includes a resource used for transmitting a preamble sequence, for example, used for transmitting a first step of a 4-step RACH. Optionally, the first indication information is differentiated through different preamble sequences or different preamble sequence groups.

Alternatively, the PRACH resource includes a resource used for transmitting a preamble sequence and uplink data, for example, used for transmitting a first step of a 2-step RACH. Optionally, the first indication information is differentiated through different preamble sequences or different preamble sequence groups. Optionally, the uplink data includes the first indication information.

Optionally, in this embodiment of this application, whether the first terminal device shares a transmission burst in a COT with another device may be determined according to a resource in the COT obtained by the first terminal device and/or a size of a resource that needs to be used.

For example, if uplink data that the first terminal device needs to send in a COT is relatively little, a transmission burst in the COT may be shared with another device.

Optionally, in this embodiment of this application, the first transmission burst may further carry second indication information, and the second indication information is used for requesting the network device to perform uplink data scheduling for the first terminal device. Therefore, the network device may schedule the first terminal device on the second transmission burst, and the first terminal device may send the PUSCH on the third transmission burst.

In this case, the first transmission burst may carry the CG-PUSCH. In this case, a part of to-be-sent data of the terminal may be first sent on the first transmission burst, and then another part is sent on the second transmission burst. Alternatively, the first transmission burst may carry no CG-PUSCH, that is, send no uplink data.

Optionally, the first indication information may indicate at least one of the following:

whether the COT includes the second transmission burst, a channel access scheme of the second transmission burst, a starting location of the second transmission burst, a length of the second transmission burst, an ending location of the first transmission burst, an ending location of the COT, a QCL relationship between channels or signals transmitted on the first transmission burst, a QCL relationship between channels or signals transmitted on the second transmission burst, a gap between the ending location of the first transmission burst and the starting location of the second transmission burst, whether the COT includes the third transmission burst, a channel access scheme of the third transmission burst, a starting location of the third transmission burst, a length of the third transmission burst, an ending location of the second transmission burst, and a gap between the ending location of the second transmission burst and the starting location of the third transmission burst.

The channel access scheme of the second transmission burst may indicate a channel access scheme used by the network device to perform LBT before the second transmission burst. The channel access scheme may be Cat-1 LBT or Cat-2 LBT. Correspondingly, 1 bit may be used to indicate whether the corresponding channel access scheme is Cat-1 LBT or Cat-2 LBT. Because there are two candidate channel access schemes, the channel access schemes may be differentiated by using 1 bit.

The gap between the ending location of the first transmission burst and the starting location of the second transmission burst may be used by the network device to determine the channel access scheme used for LBT performed before the second transmission burst.

The starting location of the second transmission burst indicates, to the network device, a location from which the second transmission burst starts. Based on the starting location of the second transmission burst, the network device may determine, based on the ending location of the first transmission burst and the starting location of the second transmission burst, a gap between the two, and therefore determine the channel access scheme for LBT performed before the second transmission burst.

For example, if the gap between the ending location of the first transmission burst and the starting location of the second transmission burst is less than or equal to 16 µs, the gNB may, for example, perform transmission immediately after the gap ends by using Cat-1 LBT.

For another example, if the gap between the ending location of the first transmission burst and the starting location of the second transmission burst is greater than 16 µs, the gNB may perform transmission after LBT succeeds by using Cat-2 LBT.

When the network device determines that the starting location of the second transmission burst and a starting location of a symbol on which the network device sends useful information in the second transmission burst are not consistent, the network device may perform signal transmission in a puncturing manner or in a manner of prolonging a length of a cyclic prefix.

The length of the second transmission burst indicates a size of a time domain resource that the network device may use to perform transmission. In this case, the network device may specify a quantity of shared resources in a COT that may enjoy a channel access scheme of a high priority, thereby more properly planning downlink transmission.

The ending location of the first transmission burst indicates, to the network device, a location at which the first transmission burst ends. The network device may determine the starting location of the second transmission burst according to the ending location of the first transmission burst, and determine a channel access scheme according to a size of the gap between the starting location of the second transmission burst and the ending location of the first transmission burst or a range to which the size of the gap belongs.

The ending location of the COT may enable the network device to learn a location at which the COT ends. Therefore, the network device may determine the ending location or the length of the second transmission burst, so that the second transmission burst does not exceed the COT, or a particular resource is reserved between the ending location of the second transmission burst and the ending location of the COT, and used for the third transmission burst, and the network device may specify a quantity of shared resources in a COT that may enjoy a channel access scheme of a high priority, thereby more properly planning downlink transmission.

The network device may perform transmission on the second transmission burst according to the QCL relationship between channels or signals transmitted on the first transmission burst. Alternatively, the second indication information may carry on the QCL relationship between channels or signals transmitted on the second transmission burst, and the network device may perform transmission on the second transmission burst according to the QCL relationship between channels or signals transmitted on the second transmission burst.

Optionally, a QCL relationship between channels or signals may be understood as: QCL assumptions of the channels or signals, or TCI-states of the channels or signals, or reference signals corresponding to spatial Rx parameters of the channels or signals, or spatial Rx parameters of the channels or signals, or transmit beams of the channels or signals, or receive beams of the channels or signals.

Optionally, in an NR-U system, a channel access manner or a signal transmission manner may be directional. Therefore, when indicating a COT related parameter, the terminal device may simultaneously indicate a QCL relationship of the UE, for example, an index of a data transmission associated SSB or CSI-RS of the UE. After receiving an indication of the QCL assumption, the network device may use a resource in the shared COT for transmission of UE with the same QCL assumption. Alternatively, the UE may be instructed to send a QCL assumption of an uplink signal, which is determined, for example, through a resource of an SRS or a PMI of the uplink signal.

Optionally, the first indication information and/or the second indication information in this embodiment of this application is carried in UCI or a DMRS.

The DMRS may be used for demodulating a PUSCH. In this case, the first transmission burst may carry the PUSCH. The DMRS may be a demodulation DMRS of the PUSCH.

It should be understood that, when the first indication information and/or the second indication information is carried in uplink control information (UCI), a PUSCH may alternatively be sent on the first transmission burst. In this case, the UCI may be associated UCI of the PUSCH.

For the foregoing indication information (which may include the first indication information and/or the second indication information), the first device selects, from a plurality of demodulation reference signals according to information content that the indication information needs to carry, a demodulation reference signal used for carrying the indication information. Correspondingly, the network device may determine a content set in a plurality of content sets according to the demodulation reference signal.

For example, the network device may configure at least two parameter sets through higher layer signaling, and each parameter set includes information such as an ending location of the first transmission burst, a remaining length or an ending location in a UE-initiated COT, a QCL relationship between channels or signals transmitted on the first transmission burst or the second transmission burst, whether the second transmission burst is a transmission burst shared by UE, and a channel access scheme corresponding to the second transmission burst. Therefore, a demodulation reference signal (DMRS) sequence that needs to be transmitted may be determined according to a parameter set that needs to be used, so that the network device may determine the corresponding parameter set according to the DMRS sequence.

Carrying information through a DMRS sequence may refer to carrying information by selecting a different DMRS sequence. Therefore, the DMRS sequence is usually applicable to an indication of relatively little information. When more parameters in a related parameter set are shared in the COT, determining may be performed in a manner of combining higher layer signaling configuration and DMRS selection.

Optionally, when the terminal device sends a scheduled-PUSCH (S-PUSCH) to the network device through the first transmission burst, the first indication information may be carried in a reference signal used for demodulating the S-PUSCH. For example, the network device allocates two DMRS sequences to the UE, and the UE selects a corresponding DMRS sequence according to whether a resource in the COT may be shared.

Optionally, when the UE sends a configured grant-PUSCH (CG-PUSCH) to the network device through the first transmission burst, the first indication information may be carried in uplink control information (UCI) associatively sent on the CG-PUSCH.

For ease of understanding, the first indication information is described below with reference to FIG. 4 and FIG. 5.

Figure 4:
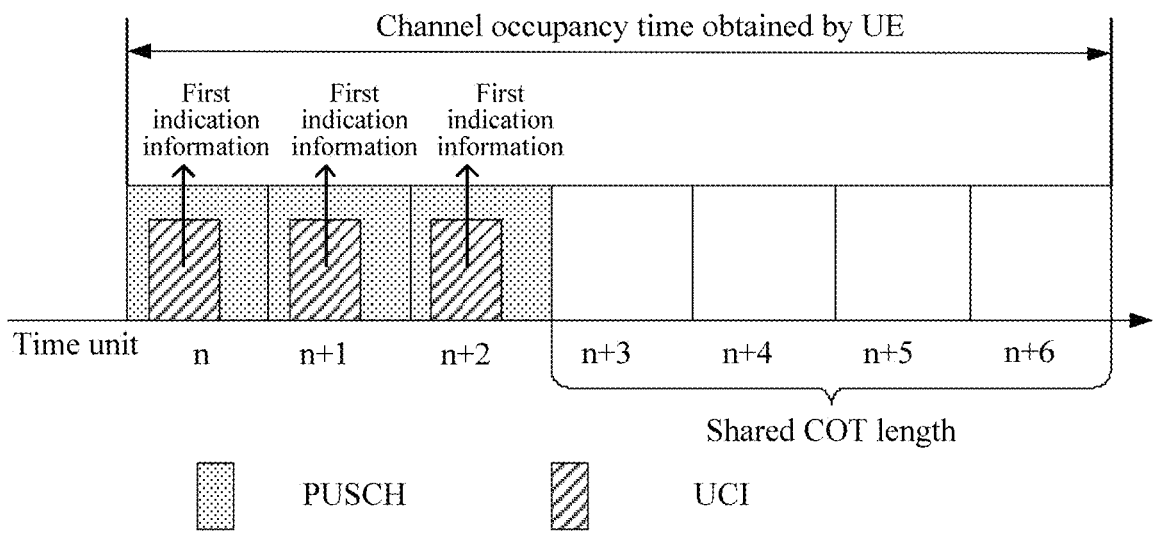
FIG. 4 is a schematic diagram of a communication process in a COT according to an embodiment of this application.

For example, as shown in FIG. 4, in the UE-initiated COT, when the UE transmits a CG-PUSCH on a time unit n, uplink control information (UCI) associatively carried in the CG-PUSCH includes the first indication information, where the first indication information includes an ending location of the first transmission burst and indication information of a shared COT length.

Specifically, the first indication information includes a first information field and a second information field. The first information field is used for indicating the ending location of the first transmission burst. For example, the first information field of the first indication information on the time unit n includes 2 bits, used to indicate that the ending location of the first transmission burst is on the current time unit n (00), a next time unit n+1 (01), a time unit n+2 (10) and a time unit n+3 (11). The second information field is used for indicating the shared COT length. For example, the second information field of the first indication information on the time unit n includes 2 bits, used to indicate that quantities of time units included in the shared COT length are respectively 1 (00), 2 (01), 3 (10) and 4 (11). Optionally, a symbol on an ending time unit that an ending symbol of the first transmission burst is or an ending symbol in the shared COT length may be configured by the network device through higher layer information.

For example, as shown in FIG. 4, the UE sends first indication information of 1011 on the time unit n, sends first indication information of 0111 on the time unit n+1, and sends first indication information of 0011 on the time unit n+2. After receiving the first indication information, a gNB may determine that COT resources that the gNB may share in the UE-initiated COT include the time unit n+3, a time unit n+4, a time unit n+5, and a time unit n+6.

It should be understood that, FIG. 4 shows sending of the first indication information on each of a plurality of time units. In this case, loss of the first indication information may be avoided. In this embodiment of this application, the first indication information may alternatively be sent on only one time unit. The time unit shown in FIG. 4 may be a slot, a symbol, a half-slot, a subframe or the like.

Figure 5:
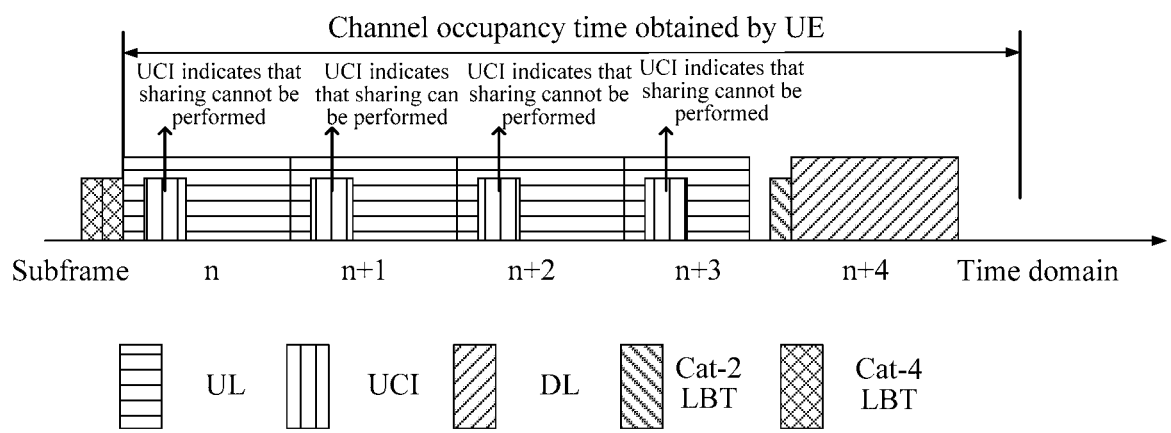
FIG. 5 is a schematic diagram of a communication process in a COT according to an embodiment of this application.

For example, as shown in FIG. 5, in the UE-initiated COT, when the UE transmits a CG-PUSCH on a subframe n, first indication information in uplink control information (UCI) associatively carried in the CG-PUSCH includes 1-bit indication information, and the UE may indicate, through the 1-bit indication information, whether a subframe n+X belongs to a resource that may be provided to the gNB for transmission in the UE's COT (or, whether the subframe n+X belongs to a resource that the UE shares with the gNB). X is a parameter of a higher-layer configuration, and has a value range of 1<X<5. When the subframe n+X belongs to a resource that the gNB may use in the UE's COT, the gNB performs Cat-2 LBT before transmission on the subframe n+X, and may perform downlink transmission after LBT succeeds. In FIG. 5, a value of X of the higher layer configuration is 3. The schematic diagram of the UCI in FIG. 5 only indicates that the UCI is transmitted through the CG-PUSCH, but does not represent a resource occupied by actual transmission of the UCI. For convenience of diagrammatic presentation, FIG. 5 shows no third transmission burst.

It should be understood that, the use of each parameter in the first indication information is described above. However, it should be understood that, this embodiment of this application is not limited thereto. Each parameter in the first indication information in this embodiment of this application may further have another use, and details are not described herein again.

The first transmission burst is mainly introduced above, and the second transmission burst and the third transmission burst are introduced below.

Optionally, in this embodiment of this application, the second transmission burst is a transmission burst transmitted by the network device to the first terminal device or a second terminal device.

Specifically, after the network device determines the second transmission burst based on the first indication information, a downlink channel or signal may be sent by using the second transmission burst, and the downlink channel or signal may be sent in a broadcast or multicast, or may be sent in a unicast manner.

Optionally, the second transmission burst may be used for transmitting at least one of the following: a PDSCH (which may be a unicast PDSCH), control information in an initial access procedure, control information in a random access procedure, control information used for mobility management, a paging message, a reference signal, a PDCCH dedicated to a terminal device, a switching command, a common PDCCH, short message service paging, a synchronization signal block (synchronization signal/PBCH block, SSB), and downlink feedback indication information (for example, a downlink HARQ). The aforementioned PDCCH and reference signal may be a PDCCH and a reference signal that individually occur, that is, accompanied by no unicast PDSCH.

The aforementioned PDCCH dedicated to a terminal device transmitted in the second transmission burst may be a PDCCH of the first terminal device.

For example, the first transmission burst may carry the foregoing second indication information, used for requesting to schedule the first terminal device, and therefore the second transmission burst may carry a PDCCH, used for scheduling the first terminal device.

Alternatively, the PDCCH dedicated to a terminal device may be a PDCCH of the second terminal device, that is, a PDCCH for scheduling the second terminal device. In this case, the first transmission burst may not carry the foregoing second indication information.

Alternatively, the PDCCH dedicated to a terminal device may be a PDCCH of a third terminal device, where the first terminal device and the third terminal device may not have the same QCL assumption.

Optionally, a sending object of the second transmission burst in this embodiment of this application may be a device other than the first terminal device. In this case, the second transmission burst may be used for transmitting information for the second terminal device, for example, a PDSCH, control information in an initial access procedure, control information in a random access procedure, control information used for mobility management, a paging message, a PDCCH dedicated to the first terminal device, a switching command, short message service paging, and downlink feedback indication information.

The aforementioned downlink feedback indication information may be feedback information for the first transmission burst, for example, feedback information for transmitting a PUSCH in the first transmission burst.

Optionally, in this embodiment of this application, a channel or a signal transmitted in the second transmission burst may be a channel or a signal that periodically occurs. If the terminal device finds that the network device needs to send a periodically occurring channel or signal in a COT, the first terminal device may share the second transmission burst with the network device.

For example, when the UE transmits a CG-PUSCH, if the UE needs to occupy many time resources (for example, a demanded quantity of uplink services is large) in the UE-initiated COT, but the time resources occupied for transmitting the CG-PUSCH include a periodic resource used by the gNB to transmit a high-priority channel or signal (for example, a PDCCH), the UE may reserve this part of resource to be used by the gNB, and continues to transmit the CG-PUSCH or an S-PUSCH after the gNB ends use of the resource.

Figure 6:
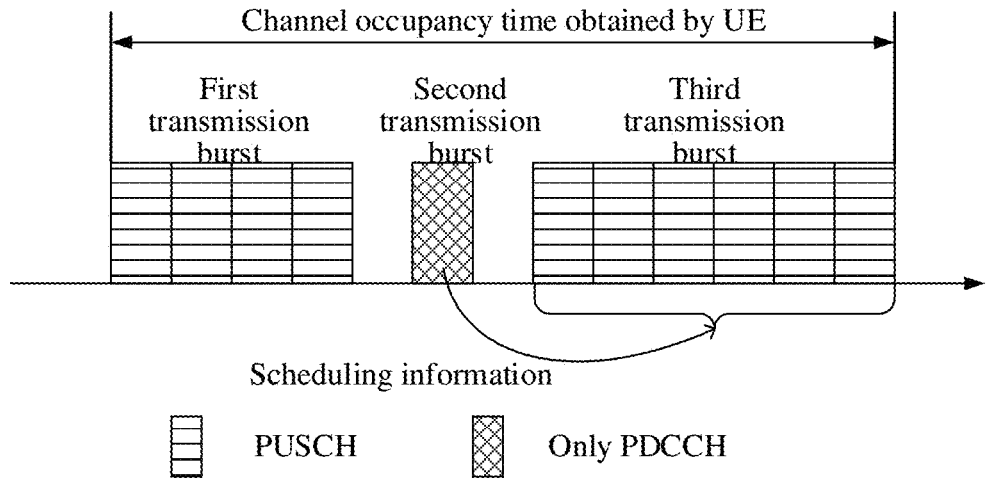
FIG. 6 is a schematic diagram of a communication process in a COT according to an embodiment of this application.

For example, as shown in FIG. 6, in a process of transmitting a CG-PUSCH in the UE-initiated COT, the UE encounters a PDCCH resource periodically occurring in the gNB, and therefore the UE ends transmission of the CG-PUSCH (for example, the first transmission burst) before the PDCCH resource and indicates, through the first indication information, that the PDCCH resource periodically occurring in the gNB (for example, the second transmission burst) belongs to a resource in the UE's COT, and the UE shares the resource to be used by the gNB. In addition, after the second transmission burst ends, the UE continues to transmit the PUSCH on the third transmission burst.

Optionally, in the example of FIG. 6, because the UE knows a location of the PDCCH resource periodically occurring in the gNB (for example, the second transmission burst), the UE may stop the first transmission burst before the PDCCH resource, and does not need to send the first indication information to perform an indication to the gNB.

Optionally, in this embodiment of this application, a channel or a signal other than a unicast downlink data channel may be referred to as a high-priority channel or signal. In this case, the high-priority channel or signal may be transmitted on the second transmission burst.

Optionally, no unicast PDSCH may be transmitted on the second transmission burst.

Optionally, in this embodiment of this application, duration of the second transmission burst may be less than or equal to preset duration. That is to say, duration in which the network device performs downlink transmission on the second transmission burst may not exceed the preset duration, for example, 1 ms.

Optionally, in this embodiment of this application, a category of a downlink channel or signal sent by the network device by using the second transmission burst may be determined according to available duration of the second transmission burst and/or remaining available duration in the COT.

Optionally, in this embodiment of this application, the second transmission burst may include third indication information, and the third indication information is used for scheduling uplink data transmission of the first terminal device. For example, the third indication information may be carried in a PDCCH. In this case, the first terminal device may send a scheduling request, that is, the aforementioned second indication information on the first transmission burst.

Information transmitted in the second transmission burst includes fourth indication information, and the fourth indication information is used for determining at least one of the following information:

a channel access scheme of the third transmission burst, a starting location of the third transmission burst, a length of the third transmission burst, an ending location of the second transmission burst, and the ending location of the COT.

Optionally, the fourth indication information is further used for determining a channel access scheme of a fourth transmission burst, and/or a sub-scheme of the channel access scheme of the fourth transmission burst (for example, according to a service priority in Cat-4 LBT). The fourth transmission burst does not belong to the COT.

Similar to the first indication information, the fourth indication information included in the second transmission burst may be used for determining a location of the third transmission burst, a channel access scheme performed before the third transmission burst, and the like.

Optionally, in this embodiment of this application, the third transmission burst is a transmission burst transmitted by the first terminal device or the second terminal device to the network device.

A receive end of the second transmission burst may be the same as or not the same as a transmit end of the third transmission burst. For example, if the second transmission burst sends a downlink channel or a signal in a unicast manner, the third transmission burst may be used for transmitting a feedback or a response of the receive end for the downlink channel or signal; or if the second transmission burst sends a downlink channel or signal in a broadcast manner, the channel or signal sent on the third transmission burst may be unrelated to the channel or signal sent on the second transmission burst.

Optionally, the third transmission burst is used for transmitting at least one of the following: a PUSCH, hybrid automatic repeat request-acknowledgement HARQ-ACK information, a random access sequence, a scheduling request, a sounding reference signal, and channel state information.

Alternatively, the second transmission burst is a transmission burst transmitted by the network device to the first terminal device or the second terminal device, and the third transmission burst may be a D2D transmission burst, for example, a transmission burst between the first terminal device and the second terminal device.

Optionally, the first terminal device further sends, to the second terminal device through the first transmission burst, indication information used by the second terminal device to determine the third transmission burst in the COT.

Optionally, in this embodiment of this application, transmission of the second transmission burst may restrict transmission of the third transmission burst.

For example, transmission duration of the second transmission burst may restrict a category of the channel or signal transmitted on the third transmission burst. For example, a category of the channel or signal transmitted on the second transmission burst may restrict the category of the channel or signal transmitted on the third transmission burst. For example, the category of the channel or signal transmitted on the second transmission burst may restrict transmission duration of the channel or signal on the third transmission burst.

Vice versa, that is, transmission of the third transmission burst may restrict transmission of the second transmission burst.

Optionally, in this embodiment of this application, when channels transmitted in the second transmission burst include a PDSCH, information transmitted in the third transmission burst includes a high-priority channel or signal. The third transmission burst is used for sending at least one of the following information:

hybrid automatic repeat request-acknowledgement HARQ-ACK information, a random access sequence, a scheduling request, a sounding reference signal, and channel state information.

The third transmission burst is used for sending the HARQ-ACK information, where the HARQ-ACK information includes HARQ-ACK information corresponding to the PDSCH.

Specifically, when the UE transmits a CG-PUSCH, if the UE needs to occupy few time resources in the UE-initiated COT, the UE may share a resource in the COT with the gNB, so that the gNB transmits a PDSCH by using the resource. Optionally, the downlink transmission is downlink transmission of the UE. Optionally, the downlink transmission may have a same QCL relationship (or a same QCL assumption) as that of downlink transmission of the UE; or the downlink transmission has a same spatial Rx parameter as that of downlink transmission of the UE. Correspondingly, to enable HARQ information corresponding to a PDSCH transmitted by the gNB may be fed back to the gNB as soon as possible, PUCCH resources used to transmit the HARQ information may also share the UE's COT.

Figure 7:
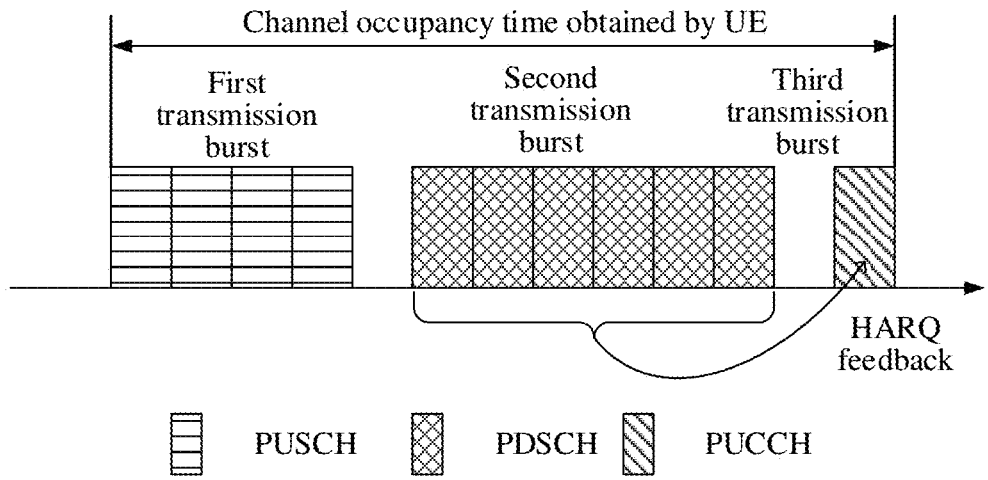
FIG. 7 is a schematic diagram of a communication process in a COT according to an embodiment of this application.

For example, as shown in FIG. 7, after the UE completes transmission of the CG-PUSCH (for example, the first transmission burst) in the UE-initiated COT, it indicates that subsequent shared resources (for example, a resource after the first transmission burst in the COT) may be used by the gNB. The gNB transmits a PDSCH to the UE by using a part (for example, a resource included in the second transmission burst) of the shared resources, and indicates that the UE may transmit HARQ information corresponding to the PDSCH by using another part (for example, a resource included in the third transmission burst) in the COT.

Therefore, when the UE's COT is shared with the gNB to transmit a PDSCH, since HARQ information corresponding to the PDSCH may be fed back in need of only few resources, a resource in the COT may be allowed to be used for transmitting the HARQ information corresponding to the PDSCH after a transmission burst of the gNB in the UE's COT ends, thereby reducing an HARQ feedback delay.

Optionally, when the third transmission burst is used for sending HARQ-ACK information, a channel time occupied by the third transmission burst is less than or equal to the first preset duration, for example, 1 ms.

Optionally, when the channels transmitted in the second transmission burst include the PDSCH, the third transmission burst is less than or equal to first preset duration, for example, 1 ms.

Optionally, the first preset duration may be preset in the first terminal device based on a protocol, or may be configured on a network side.

Optionally, in this embodiment of this application, when the second transmission burst includes a unicast PDSCH, the third transmission burst is used for transmitting HARQ-ACK information, where the HARQ-ACK information includes HARQ-ACK information corresponding to the unicast PDSCH. Further optionally, duration of the third transmission burst is less than or equal to the first preset duration.

Optionally, in this embodiment of this application, when the second transmission burst is used for sending a high-priority channel or signal, for example, including at least one of control information in an initial access procedure, control information in a random access procedure, control information used for mobility management, a paging message, a reference signal, a PDCCH dedicated to a terminal device, a switching command, a common PDCCH, short message service paging, a synchronization signal block (SSB), and downlink feedback indication information, the third transmission burst may be used for transmitting a PUSCH. The aforementioned PDCCH and reference signal may be a PDCCH and a reference signal that individually occur, that is, accompanied by no unicast PDSCH.

Specifically, when the UE transmits a CG-PUSCH, if a transmission time of the CG-PUSCH includes a time resource used by the gNB to send a periodic high-priority signal or channel, the UE may share the part of resource with the gNB for transmission, and the UE continues to transmit a PUSCH after the gNB ends transmission. The PUSCH that the UE continues to transmit may be a CG-PUSCH or an S-PUSCH.

Optionally, in this embodiment of this application, when the second transmission burst is used for transmitting a signal or channel including no unicast PDSCH, a channel time occupied by the second transmission burst is less than or equal to preset duration, for example, 1 ms. Optionally, when the second transmission burst is used for transmitting a high-priority signal or channel, a channel time occupied by the second transmission burst is less than or equal to preset duration.

Optionally, in this embodiment of this application, when a channel time occupied by the second transmission burst is less than or equal to preset duration, for example, 1 ms, the third transmission burst may be used for transmitting a PUSCH.

Optionally, in this embodiment of this application, when a channel time occupied by the second transmission burst is less than or equal to preset duration, for example, 1 ms, the third transmission burst may be used for D2D transmission.

Optionally, the preset duration may be preset in the network device or the terminal device based on a protocol, or may be configured on a network side.

It should be understood that, the solution of the method 200 in this embodiment of this application may also be used for a device to device (D2D) scenario, that is, the foregoing network device may be replaced with a terminal device, which may be, for example, another terminal device different from the first terminal device, and the another terminal device may be the second terminal device mentioned below or be not the second terminal device mentioned below.

It should be further understood that, in this embodiment of this application, the first terminal device may not send the first indication information in the first transmission burst. For example, after the network device receives, in the first transmission burst, uplink data transmitted by the first terminal device, if the gap between the starting location of the downlink transmission burst and the ending location of the uplink transmission burst is less than or equal to 16 µs, the network device may immediately perform the uplink transmission; or if the gap is greater than 16 µs and less than or equal to 25 µs, the UE may perform Cat-2 LBT before transmission.

Figure 8:
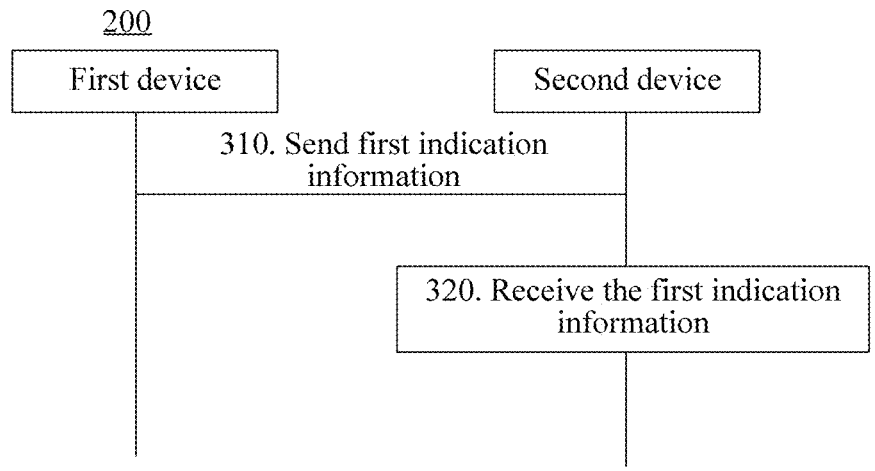
FIG. 8 is a schematic flowchart of a wireless communication method for an unlicensed spectrum according to an embodiment of this application.

FIG. 8 is a schematic flowchart of a wireless communication method 300 for an unlicensed spectrum according to an embodiment of this application. The first device mentioned below may be a terminal device, and the second device may be a network device; or the first device may be a terminal device, and the second device may also be a terminal device.

In 310, a first device sends first indication information to a second device through a first transmission burst in a channel occupancy time (COT) obtained by the first device, where the first indication information is used for determining at least one of the following information:

whether the first device shares a resource in the COT, a channel access scheme of a second transmission burst in the COT, an ending location of the first transmission burst, a starting location of the second transmission burst, a length of the second transmission burst, an ending location or a remaining length of the COT, a QCL relationship between channels or signals transmitted on the first transmission burst, a QCL relationship between channels or signals to be transmitted on the second transmission burst, and a gap between the ending location of the first transmission burst and the starting location of the second transmission burst.

In 320, the second device receives the first indication information.

Whether the first device shares a resource in the COT may refer to whether the first device shares the resource in the COT or does not share the resource in the COT. For example, 1 represents shared, and 0 represents unshared.

The channel access scheme of the second transmission burst may indicate a channel access scheme used by the second device to perform LBT before the second transmission burst. The channel access scheme may be Cat-1 LBT or Cat-2 LBT. Correspondingly, 1 bit may be used to indicate whether the corresponding channel access scheme is Cat-1 LBT or Cat-2 LBT. Because there are two candidate channel access schemes, the channel access schemes may be differentiated by using 1 bit.

The gap between the ending location of the first transmission burst and the starting location of the second transmission burst may be used by the second device to determine the channel access scheme used for LBT performed before the second transmission burst.

The starting location of the second transmission burst indicates, to the second device, a location from which the second transmission burst starts. Based on the starting location of the second transmission burst, the second device may determine, based on the ending location of the first transmission burst and the starting location of the second transmission burst, a gap between the two, and therefore determine the channel access scheme for LBT performed before the second transmission burst.

For example, if the gap between the ending location of the first transmission burst and the starting location of the second transmission burst is less than or equal to 16 µs, the gNB may, for example, perform transmission immediately after the gap ends by using Cat-1 LBT.

For another example, if the gap between the ending location of the first transmission burst and the starting location of the second transmission burst is greater than 16 µs, the gNB may perform transmission after LBT succeeds by using Cat-2 LBT.

When the second device determines that the starting location of the second transmission burst and a starting location of a symbol on which the second device sends useful information in the second transmission burst are not consistent, the second device may perform signal transmission in a puncturing manner or in a manner of prolonging a length of a cyclic prefix.

The length of the second transmission burst indicates a size of a time domain resource that the second device may use to perform transmission. In this case, the second device may specify a quantity of shared resources in a COT that may enjoy a channel access scheme of a high priority, thereby more properly planning downlink transmission.

The ending location of the first transmission burst indicates, to the second device, a location at which the first transmission burst ends. The second device may determine the starting location of the second transmission burst according to the ending location of the first transmission burst, and determine a channel access scheme according to a size of the gap between the starting location of the second transmission burst and the ending location of the first transmission burst or a range to which the size of the gap belongs.

The ending location or a remaining length of the COT may enable the network device to learn a location at which the COT ends. Therefore, the second device may determine the ending location or the length of the second transmission burst, so that the second transmission burst does not exceed the COT, or a particular resource is reserved between the ending location of the second transmission burst and the ending location of the COT, and used for the third transmission burst, and the second device may specify a quantity of shared resources in a COT that may enjoy a channel access scheme of a high priority, thereby more properly planning downlink transmission.

The QCL relationship between channels or signals transmitted on the first transmission burst may indicate a spatial Tx parameter or spatial Rx parameter used by the first terminal device, so that the second device may perform transmission of the second transmission burst by using the corresponding spatial parameter.

Alternatively, the first indication information may carry determining information of a spatial QCL parameter of a channel or signal transmitted on the second transmission burst, so that the second device may perform transmission of the second transmission burst directly by using the corresponding spatial QCL parameter.

Specifically, in an NR-U system, a channel access manner or a signal transmission manner may be directional. Therefore, when indicating a COT related parameter, the terminal device may simultaneously indicate a QCL relationship of the UE, for example, an index of a data transmission associated SSB or CSI-RS of the UE. After receiving an indication of the QCL relationship, the network device may use a resource in the shared COT for transmission of UE with the same QCL relationship.

Optionally, the first indication information and/or the second indication information in this embodiment of this application is carried in UCI or a DMRS.

The DMRS may be used for demodulating a PUSCH. In this case, the first transmission burst may carry the PUSCH. The DMRS may be an associated DMRS of the PUSCH.

It should be understood that, when the first indication information is carried in UCI, the first transmission burst may alternatively send a PUSCH. In this case, the UCI may be associated UCI of the PUSCH.

For the first indication information, the first device selects, from a plurality of demodulation reference signals according to information content that the indication information needs to carry, the demodulation reference signal used for carrying the indication information. Correspondingly, the network device may determine a content set in a plurality of content sets according to the demodulation reference signal.

For example, the network device may configure at least two parameter sets through higher layer signaling, and each parameter set includes information such as an ending location of the first transmission burst, a remaining length or an ending location in a UE-initiated COT, a QCL relationship between channels or signals transmitted on the first transmission burst or the second transmission burst, whether the second transmission burst is a transmission burst shared by UE, and a channel access scheme corresponding to the second transmission burst. Therefore, a DMRS sequence that needs to be transmitted may be determined according to a parameter set that needs to be used, so that the network device may determine the corresponding parameter set according to the DMRS sequence.

Carrying information through a DMRS sequence may refer to carrying information by selecting a different DMRS sequence. Therefore, the DMRS sequence is usually applicable to an indication of relatively little information. When more parameters in a related parameter set are shared in the COT, determining may be performed in a manner of combining higher layer signaling configuration and DMRS selection.

Optionally, when the terminal device sends a scheduled-PUSCH (S-PUSCH) to the network device through the first transmission burst, the first indication information may be carried in a reference signal used for demodulating the S-PUSCH. For example, the network device allocates two DMRS sequences to the UE, and the UE selects a corresponding DMRS sequence according to whether a resource in the COT may be shared.

Optionally, when the UE sends a configured grant-PUSCH (CG-PUSCH) to the network device through the first transmission burst, the first indication information may be carried in uplink control information (UCI) associatively sent on the CG-PUSCH.

Therefore, in this embodiment of this application, a first device sends first indication information to a second device through a first transmission burst in a channel occupancy time (COT) obtained by the first device, where the first indication information is used for determining at least one of the following information: whether the first device shares a resource in the COT, a channel access scheme of a second transmission burst in the COT, an ending location of the first transmission burst, a starting location of the second transmission burst, a length of the second transmission burst, an ending location or a remaining length of the COT, a QCL relationship between channels or signals transmitted on the first transmission burst, a QCL relationship between channels or signals to be transmitted on the second transmission burst, and a gap between the ending location of the first transmission burst and the starting location of the second transmission burst. The first device may implement transmission on the second transmission burst through the first information.

FIG. 9 is a schematic flowchart of a wireless communication method 400 for an unlicensed spectrum according to an embodiment of this application. The method 400 may be implemented by a terminal device or a network device.

In 410, perform channel detection in first detection duration on an unlicensed spectrum, where the first detection duration is greater than 16 microseconds and is less than or equal to microseconds, the first detection duration includes at least one detection slot, and the detection slot is located at a head end or a tail end of the first detection duration. The detection mentioned here may be Cat-2 LBT.

Optionally, in this embodiment of this application, performing detection on a channel may be performing detection on a detection slot, and the process includes: if a communications device detects a channel in a detection slot, and power detected by the communications device in the time of at least a preset value such as 4 μs in the detection slot is less than an energy detection threshold, considering the detection slot as being idle; otherwise, considering the detection slot as being occupied. Optionally, the energy detection threshold is preset or calculated according to a formula agreed on in a protocol.

Optionally, detection duration in this embodiment of this application may be less than or equal to a length between neighboring transmission bursts.

For example, when a length of a gap is greater than 25 μs, detection duration is 25 μs. For another example, when a length of a gap is less than or equal to 25 μs, detection duration is equal to the gap.

Optionally, in this embodiment of this application, at least one of a quantity of the detection slot, a length of the detection slot and a location of the detection slot may be determined according to the first detection duration.

Specifically, when a size of a gap between two transmission bursts located in a same COT is variable, the communications device may perform channel detection by using Cat-2 LBT, and how to perform channel detection by using Cat-2 LBT may be determined according to the size of the gap. For example, at least one of a quantity of the detection slot, a length of the detection slot and a location of the detection slot may be determined according to the size of the gap.

It should be understood that, such a solution of determining at least one of a quantity of the detection slot, a length of the detection slot and a location of the detection slot according to detection duration may be used for another scenario, which is, for example, not limited to a scenario in which the first detection duration is greater than 16 microseconds and less than or equal to 25 microseconds.

Optionally, in this embodiment of this application, the at least one detection slot includes a first detection slot located at the head end of the first detection duration. The first detection slot may be 9 μs, or may be other duration, for example, 8 μs.

Optionally, in this embodiment of this application, the at least one detection slot includes a second detection slot located at the tail end of the first detection duration. The second detection slot may be 9 μs, or may be other duration, for example, 8 μs.

It should be understood that, in this embodiment of this application, the first detection slot and the second detection slot may coexist. For example, as shown in FIG. 10, detection duration of Y µs may include a clear channel assessment (CCA) slot having a length of Z1 µs and a CCA slot having a length of Z2 µs. Alternatively, either the first detection slot or the second detection slot may exist.

Description is performed below by using an example in which the first detection slot and the second detection slot are both included.

In an implementation, a length of the first detection slot is 9 microseconds, and a length of the second detection slot is 9 microseconds. In this case, the first detection duration is optionally greater than or equal to 18 microseconds and less than or equal to 25 microseconds.

In another implementation, a length of the first detection slot is 8 microseconds, and a length of the second detection slot is 8 microseconds. In this case, optionally, the first detection duration is greater than or equal to 18 microseconds and less than or equal to 25 microseconds, or the first detection duration is greater than or equal to 17 microseconds and less than 18 microseconds, or the first detection duration is greater than 16 microseconds and less than 17 microseconds.

In another implementation, a length of the first detection slot is 8 microseconds, and a length of the second detection slot is 9 microseconds. In this case, optionally, the first detection duration is greater than or equal to 18 microseconds and less than or equal to 25 microseconds, or the first detection duration is greater than or equal to 17 microseconds and less than 18 microseconds.

In another implementation, a length of the first detection slot is 9 microseconds, and a length of the second detection slot is 8 microseconds. In this case, optionally, the first detection duration is greater than or equal to 18 microseconds and less than or equal to 25 microseconds, or the first detection duration is greater than or equal to 17 microseconds and less than 18 microseconds.

In another implementation, a length of the first detection slot is Z1 microseconds, and a length of the second detection slot is (Y-Z1) microseconds. For example, a length of the first detection slot is 9 microseconds, and a length of the second detection slot is (Y-9) microseconds, where Y represents the first detection duration, and optionally, a value of Y is greater than 16 microseconds and less than or equal to 25 microseconds.

In another implementation, a length of the second detection slot is Z2 microseconds, and a length of the first detection slot is (Y-Z2) microseconds. For example, a length of the second detection slot is 9 microseconds, and a length of the first detection slot is (Y-9) microseconds, where Y represents the first detection duration, and optionally, a value of Y is greater than 16 microseconds and less than or equal to 25 microseconds.

Optionally, in this embodiment of this application, when a length of a detection slot is variable, for example, a value of Y is greater than 16 microseconds and less than or equal to microseconds, the length of the detection slot is (Y-9) microseconds, that is, the length of the detection slot is greater than 7 microseconds and less than or equal to 16 microseconds, and a process of performing detection on the detection slot includes: if a communications device detects a channel in a detection slot having a variable length, and power detected by the communications device in the time of at least a preset value such as 4 µs in the detection slot having a variable length is less than an energy detection threshold, considering the detection slot having a variable length as being idle; otherwise, considering the detection slot having a variable length as being occupied.

Therefore, when the first detection duration is greater than 16 microseconds and less than or equal to 25 microseconds, detection may be performed in at least one detection slot at a head end or a tail end of the first detection duration, to implement detection in the detection duration greater than 16 microseconds and less than or equal to 25 microseconds.

It should be understood that, methods in the embodiments of this application may be combined and used. For example, a first method may be used in a second method and a third method, the second method may be used in the first and third methods, and similarly, the third method may also be used in the first and second methods.

FIG. 11 is a schematic block diagram of a terminal device 500 for an unlicensed spectrum according to an embodiment of this application. The terminal device 500 includes a communications unit 510.

The communications unit 510 is configured to send first indication information to a network device through a first transmission burst in a channel occupancy time (COT) obtained by the terminal device, where the COT includes a second transmission burst and a third transmission burst, and the first indication information is used by the network device to determine the second transmission burst in the COT.

Optionally, in this embodiment of this application, the second transmission burst is a transmission burst transmitted by the network device to the terminal device or a second terminal device; and/or the third transmission burst is a transmission burst transmitted by the terminal device or the second terminal device to the network device.

Optionally, in this embodiment of this application, the terminal device and the second terminal device have a same quasi-co-located (QCL) assumption.

Optionally, in this embodiment of this application, channels transmitted in the second transmission burst include a physical downlink shared channel (PDSCH).

Optionally, in this embodiment of this application, the third transmission burst is used for sending at least one of the following information: hybrid automatic repeat request-acknowledgement HARQ-ACK information, a random access sequence, a scheduling request, a sounding reference signal, and channel state information.

Optionally, in this embodiment of this application, the third transmission burst is used for sending the HARQ-ACK information, where the HARQ-ACK information includes HARQ-ACK information corresponding to the PDSCH.

Optionally, in this embodiment of this application, when the channels transmitted in the second transmission burst include the PDSCH, the third transmission burst is less than or equal to first preset duration.

Optionally, in this embodiment of this application, the second transmission burst is used for sending at least one of the following information: control information in an initial access procedure, control information in a random access procedure, control information used for mobility management, a paging message, a reference signal, a PDCCH dedicated to a terminal device, a switching command, a common PDCCH, short message service paging, a synchronization signal block (SSB), and downlink feedback indication information.

Optionally, in this embodiment of this application, channels transmitted in the second transmission burst include no unicast PDSCH.

Optionally, in this embodiment of this application, duration of the second transmission burst is less than or equal to second preset duration.

Optionally, in this embodiment of this application, channels transmitted in the third transmission burst include a physical uplink shared channel (PUSCH).

Optionally, in this embodiment of this application, information transmitted in the first transmission burst includes second indication information, and the second indication information is used for requesting the network device to perform uplink data scheduling for the terminal device.

Optionally, in this embodiment of this application, the communications unit 510 is further configured to: receive, in the second transmission burst, third indication information sent by the network device, where the third indication information is used for scheduling uplink data transmission of the terminal device.

Optionally, in this embodiment of this application, the first indication information is used for determining at least one of the following information: a channel access scheme of the second transmission burst, a starting location of the second transmission burst, a length of the second transmission burst, an ending location of the first transmission burst, an ending location of the COT, a QCL relationship between channels or signals transmitted on the first transmission burst, and a gap between the ending location of the first transmission burst and the starting location of the second transmission burst.

Optionally, in this embodiment of this application, information transmitted in the second transmission burst includes fourth indication information, and the fourth indication information is used for determining at least one of the following information:
a channel access scheme of the third transmission burst, a starting location of the third transmission burst, a length of the third transmission burst, an ending location of the second transmission burst, and the ending location of the COT.

It should be understood that, the terminal device 500 may correspond to the first terminal device in the foregoing method embodiment, and may implement corresponding operations of the first terminal device. For brevity, details are not described herein again.

FIG. 12 is a schematic block diagram of a communications device 600 for an unlicensed spectrum according to an embodiment of this application. The communications device 600 includes a communications unit 610.

The communications unit 610 is configured to send first indication information to a second device through a first transmission burst in a channel occupancy time (COT) obtained by the communications device, where the first indication information is used for determining at least one of the following information:
whether the communications device shares a resource in the COT, a channel access scheme of a second transmission burst in the COT, an ending location of the first transmission burst, a starting location of the second transmission burst, a length of the second transmission burst, an ending location or a remaining length of the COT, a QCL relationship between channels or signals transmitted on the first transmission burst, a QCL relationship between channels or signals to be transmitted on the second transmission burst, and a gap between the ending location of the first transmission burst and the starting location of the second transmission burst.

Optionally, in this embodiment of this application, the first indication information is carried in uplink control information (UCI) or a demodulation reference signal.

Optionally, in this embodiment of this application, the first indication information is carried in a demodulation reference signal, and the communications device 600 further includes a processing unit 620, further configured to: select, by the communications device 600 from a plurality of demodulation reference signals according to information content that the first indication information needs to carry, the demodulation reference signal used for carrying the first indication information.

Optionally, in this embodiment of this application, the UCI or the demodulation reference signal is associated UCI or an associated demodulation reference signal of a PUSCH sent by the communications device, and the PUSCH is transmitted on the first transmission burst.

Optionally, in this embodiment of this application, the communications device is a terminal device, and the second device is a network device; or
the communications device is a terminal device, and the second device is a terminal device.

It should be understood that, the communications device 600 may be configured to implement corresponding operations implemented by the first device in the method embodiment. For brevity, details are not described herein again.

FIG. 13 is a schematic block diagram of a communications device 700 for an unlicensed spectrum according to an embodiment of this application. The communications device 700 includes a communications unit 710.

The communications unit 710 is configured to perform channel detection in first detection duration on an unlicensed spectrum, where the first detection duration is greater than 16 microseconds and is less than or equal to 25 microseconds, the first detection duration includes at least one detection slot, and the detection slot is located at a head end or a tail end of the first detection duration.

Optionally, in this embodiment of this application, the communications device 700 further includes a processing unit 720, configured to:
determine at least one of a quantity of the detection slot, a length of the detection slot and a location of the detection slot according to the first detection duration.

Optionally, in this embodiment of this application, the at least one detection slot includes a first detection slot located at the head end of the first detection duration.

Optionally, in this embodiment of this application, the at least one detection slot includes a second detection slot located at the tail end of the first detection duration.

Optionally, in this embodiment of this application, the at least one detection slot includes a first detection slot and a second detection slot that are located at the head end and the tail end of the first detection duration, where a length of the first detection slot is 9 microseconds, and a length of the second detection slot is 9 microseconds.

Optionally, in this embodiment of this application, the at least one detection slot includes a first detection slot and a second detection slot that are located at the head end and the tail end of the first detection duration, where
a length of the first detection slot is 8 microseconds, and a length of the second detection slot is 8 microseconds.

Optionally, in this embodiment of this application, the at least one detection slot includes a first detection slot and a second detection slot that are located at the head end and the tail end of the first detection duration, where
a length of the first detection slot is 8 microseconds, and a length of the second detection slot is 9 microseconds.

Optionally, in this embodiment of this application, the at least one detection slot includes a first detection slot and a second detection slot that are located at the head end and the tail end of the first detection duration, where
a length of the first detection slot is 9 microseconds, and a length of the second detection slot is 8 microseconds.

Optionally, in this embodiment of this application, the first detection duration is greater than or equal to 18 microseconds and less than or equal to 25 microseconds.

Optionally, in this embodiment of this application, the first detection duration is greater than or equal to 17 microseconds and less than 18 microseconds.

Optionally, in this embodiment of this application, the first detection duration is greater than 16 microseconds and less than 17 microseconds.

Optionally, the communications device 700 may be configured to implement corresponding operations implemented by the terminal device or the network device in the foregoing method embodiment. For brevity, details are not described herein again.

Figure 14:
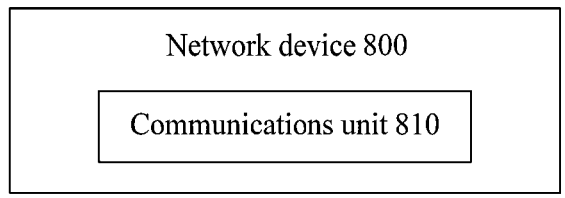
FIG. 14 is a schematic block diagram of a network device according to an embodiment of this application.

FIG. 14 is a schematic block diagram of a network device 800 for an unlicensed spectrum according to an embodiment of this application. The network device 800 includes a communications unit 810.

The communications unit 810 is configured to receive first indication information sent by a first terminal device, where the first indication information is transmitted on a first transmission burst in a channel occupancy time (COT) obtained by the first terminal device, where
the COT includes a second transmission burst and a third transmission burst, and the first indication information is used by the network device to determine the second transmission burst in the COT.

Optionally, in this embodiment of this application, the second transmission burst is a transmission burst transmitted by the network device to the first terminal device or a second terminal device; and/or the third transmission burst is a transmission burst transmitted by the first terminal device or the second terminal device to the network device.

Optionally, in this embodiment of this application, the first terminal device and the second terminal device have a same quasi-co-located (QCL) assumption.

Optionally, in this embodiment of this application, channels transmitted in the second transmission burst include a physical downlink shared channel (PDSCH).

Optionally, in this embodiment of this application, the third transmission burst is used for sending at least one of the following information:
hybrid automatic repeat request-acknowledgement HARQ-ACK information, a random access sequence, a scheduling request, a sounding reference signal, and channel state information.

Optionally, in this embodiment of this application, the third transmission burst is used for sending the HARQ-ACK information, where the HARQ-ACK information includes HARQ-ACK information corresponding to the PDSCH.

Optionally, in this embodiment of this application, when the channels transmitted in the second transmission burst include the PDSCH, the third transmission burst is less than or equal to first preset duration.

Optionally, in this embodiment of this application, the second transmission burst is used for sending at least one of the following information:
control information in an initial access procedure, control information in a random access procedure, control information used for mobility management, a paging message, a reference signal, a PDCCH dedicated to a terminal device, a switching command, a common PDCCH, short message service paging, a synchronization signal block (SSB), and downlink feedback indication information.

Optionally, in this embodiment of this application, channels transmitted in the second transmission burst include no unicast PDSCH.

Optionally, in this embodiment of this application, duration of the second transmission burst is less than or equal to second preset duration.

Optionally, in this embodiment of this application, channels transmitted in the third transmission burst include a physical uplink shared channel (PUSCH).

Optionally, in this embodiment of this application, information transmitted in the first transmission burst includes second indication information, and the second indication information is used for requesting the network device to perform uplink data scheduling for the first terminal device.

Optionally, in this embodiment of this application, the communications unit is further configured to: send third indication information to the first terminal device on the second transmission burst, where the third indication information is used for scheduling uplink data transmission of the first terminal device.

Optionally, in this embodiment of this application, the first indication information is used for determining at least one of the following information:
a channel access scheme of the second transmission burst, a starting location of the second transmission burst, a length of the second transmission burst, an ending location of the first transmission burst, an ending location of the COT, a QCL relationship between channels or signals transmitted on the first transmission burst, and a gap between the ending location of the first transmission burst and the starting location of the second transmission burst.

Optionally, in this embodiment of this application, information transmitted in the second transmission burst includes fourth indication information, and the fourth indication information is used for determining at least one of the following information: a channel access scheme of the third transmission burst, a starting location of the third transmission burst, a length of the third transmission burst, an ending location of the second transmission burst, and the ending location of the COT.

Optionally, the network device 800 may be configured to implement corresponding operations implemented by the terminal device or the network device in the foregoing method embodiment. For brevity, details are not described herein again.

Figure 15:
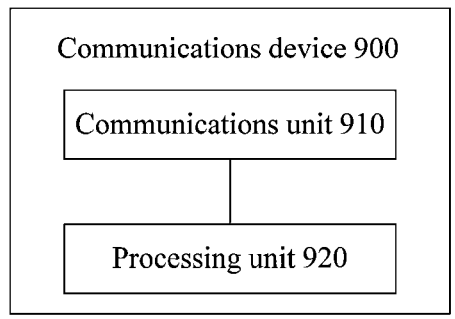
FIG. 15 is a schematic block diagram of a communications device according to an embodiment of this application.

FIG. 15 is a schematic block diagram of a communications device 900 for an unlicensed spectrum according to an embodiment of this application. The communications device 900 includes a communications unit 910.

The communications unit 910 is configured to receive first indication information sent by a first device, where the first indication information is sent by the first device through a first transmission burst in a channel occupancy time (COT) obtained by the first device, where the first indication information is used for determining at least one of the following information: whether the first device shares a resource in the COT, a channel access scheme of a second transmission burst in the COT, an ending location of the first transmission burst, a starting location of the second transmission burst, a length of the second transmission burst, an ending location or a remaining length of the COT, a QCL relationship between channels or signals transmitted on the first transmission burst, a QCL relationship between channels or signals to be transmitted on the second transmission burst, and a gap between the ending location of the first transmission burst and the starting location of the second transmission burst.

Optionally, in this embodiment of this application, the first indication information is carried in uplink control information (UCI) or a demodulation reference signal.

Optionally, in this embodiment of this application, the first indication information is carried in a demodulation reference signal, and the communications device further includes a processing unit 920, configured to: select an information set from a plurality of information sets according to the demodulation reference signal carrying the first indication information, where the selected information set includes information indicated by the first indication information.

Optionally, in this embodiment of this application, the UCI or the demodulation reference signal is associated UCI or an associated demodulation reference signal of a PUSCH sent by the first device, and the PUSCH is transmitted on the first transmission burst.

Optionally, in this embodiment of this application, the first device is a terminal device, and the communications device is a network device; or
  the first device is a terminal device, and the communications device is a terminal device.

Optionally, the communications device 900 may be configured to implement corresponding operations implemented by the second device in the foregoing method embodiment. For brevity, details are not described herein again.

Figure 16:
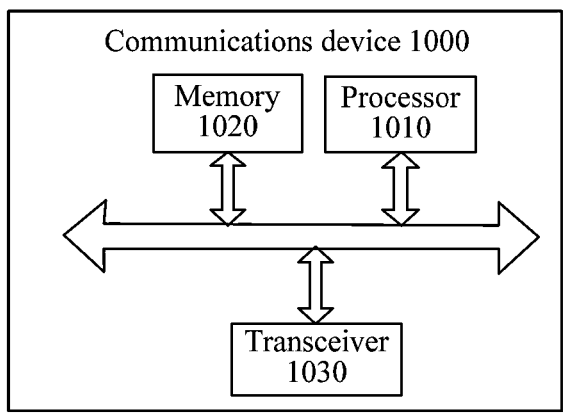
FIG. 16 is a schematic block diagram of a communications device according to an embodiment of this application.

FIG. 16 is a schematic structural diagram of a communications device 1000 according to an embodiment of this application. The communications device 1000 shown in FIG. 16 includes a processor 1010. The processor 1010 may invoke a computer program from a memory and run the computer program, to implement the method in the embodiments of this application.

Optionally, as shown in FIG. 16, the communications device 1000 may further include a memory 1020. The processor 1010 may invoke the computer program from the memory 1020 and run the computer program, to implement the method in the embodiments of this application.

The memory 1020 may be a component independent of the processor 1010, or may be integrated into the processor 1010.

Optionally, as shown in FIG. 16, the communications device 1000 may further include a transceiver 1030, and the processor 1010 may control the transceiver 1030 to communicate with another device and specifically may send information or data to another device or receive information or data sent by another device.

The transceiver 1030 may include a transmitter and a receiver. The transceiver 1030 may further include one or more antennas.

Optionally, the communications device 1000 may be specifically the network device of the embodiments of this application, and the communications device 1000 may implement a corresponding process implemented by the network device in each method of the embodiments of this application. For brevity, details are not described herein again.

Optionally, the communications device 1000 may be specifically the mobile terminal/terminal device of the embodiments of this application, and the communications device 1000 may implement a corresponding process implemented by the mobile terminal/terminal device in each method of the embodiments of this application. For brevity, details are not described herein again.

Figure 17:
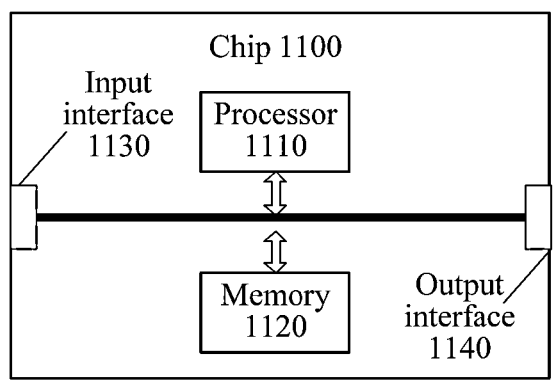
FIG. 17 is a schematic block diagram of a chip according to an embodiment of this application.

FIG. 17 is a schematic structural diagram of a chip according to an embodiment of this application. The chip 1100 shown in FIG. 17 includes a processor 1110. The processor 1110 may invoke a computer program from a memory and run the computer program, to implement the method in the embodiments of this application.

Optionally, as shown in FIG. 17, the chip 1100 may further include a memory 1120. The processor 1110 may invoke the computer program from the memory 1120 and run the computer program, to implement the method in the embodiments of this application.

The memory 1120 may be a component independent of the processor 1110, or may be integrated into the processor 1110.

Optionally, the chip 1100 may further include an input interface 1130. The processor 1110 may control the input interface 1130 to communicate with another device or chip, and may specifically obtain information or data sent by the another device or chip.

Optionally, the chip 1100 may further include an output interface 1140. The processor 1110 may control the output interface 1140 to communicate with another device or chip, and may specifically output information or data to the another device or chip.

Optionally, the chip may be applied to the network device in the embodiments of this application, and the chip can implement corresponding procedures implemented by the network device in various methods in the embodiments of this application. For brevity, details are not described herein again.

Optionally, the chip may be applied to the mobile terminal/terminal device in the embodiments of this application, and the chip can implement corresponding procedures implemented by the mobile terminal/terminal device in various methods in the embodiments of this application. For brevity, details are not described herein again.

It should be understood that, the chip mentioned in the embodiments of this application may also be referred to as a system-level chip, a system chip, a chip system, a system on chip, or the like.

It should be understood that, the processor of this embodiment of this application may be an integrated circuit chip, and has a signal processing capability. During implementation, the steps of the foregoing method embodiment may be implemented by using a hardware integrated logic circuit in the processor or implemented by using an instruction in a software form. The foregoing processor may be a general purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps and logical block diagrams disclosed in the embodiments of this application. The general purpose processor may be a microprocessor or the processor may be any conventional processor and the like. Steps of the methods disclosed with reference to the embodiments of this application may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

It can be understood that, the memory in the embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that, the memory for the system and the method described herein aims to include but not limited to these memories and any other suitable types of memories.

It should be understood that, the foregoing memory is described as an example other than a limitation. For example, the memory in this embodiment of this application may be further a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), a direct rambus random access memory (DR RAM), or the like. That is to say, the memory in this embodiment of this application aims to include but not limited to these memories and any other suitable types of memories.

An embodiment of this application further provides a computer readable storage medium, configured to store a computer program.

Optionally, the computer readable storage medium may be applied to the network device in the embodiments of this application, and the computer program enables a computer to perform a corresponding process, implemented by the network device, in each method of the embodiments of this application. For brevity, details are not described herein again.

Optionally, the computer readable storage medium may be applied to the mobile terminal/terminal device in the embodiments of this application, and the computer program enables a computer to perform a corresponding process, implemented by the mobile terminal/terminal device, in each method of the embodiments of this application. For brevity, details are not described herein again.

An embodiment of this application further provides a computer program product, including a computer program instruction.

Optionally, the computer program product may be applied to the network device in the embodiments of this application, and the computer program instruction enables a computer to perform a corresponding process, implemented by the network device, in each method of the embodiments of this application. For brevity, details are not described herein again.

Optionally, the computer program product may be applied to the mobile terminal/terminal device in the embodiments of this application, and the computer program instruction enables a computer to perform a corresponding process, implemented by the mobile terminal/terminal device, in each method of the embodiments of this application. For brevity, details are not described herein again.

An embodiment of this application further provides a computer program.

Optionally, the computer program may be applied to the network device in the embodiments of this application, and when the computer program is run on a computer, the computer is enabled to perform a corresponding process, implemented by the network device, in each method of the embodiments of this application. For brevity, details are not described herein again.

Optionally, the computer program may be applied to the mobile terminal/terminal device in the embodiments of this application, and when the computer program is run on a computer, the computer is enabled to perform a corresponding process, implemented by the mobile terminal/terminal device, in each method of the embodiments of this application. For brevity, details are not described herein again.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in the embodiment of this application. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for wireless communication on an unlicensed spectrum, the method comprising:
sending, by a terminal device, more than two pieces of first indication information to a network device in a first transmission burst in a channel occupancy time (COT) initiated by the terminal device;
wherein the more than two pieces of first indication information are used for determining: a starting location of a second transmission burst in the COT and a length of the second transmission burst in the COT, wherein the second transmission burst is shared with the network device to perform a downlink transmission;
wherein the length of the second transmission burst in the COT indicated by a first piece of first indication information is the same as the length of the second transmission burst in the COT indicated by a second piece of first indication information.

2. The method of claim 1, wherein the more than two pieces of first indication information are used for determining whether to share a resource in the COT initiated by the terminal device with the network device or not.

3. The method of claim 1, wherein the more than two pieces of first indication information are carried in uplink control information (UCI) of a configured-granted physical uplink shared channel (CG-PUSCH) in the first transmission burst.

4. The method of claim 1, wherein one or more channels transmitted in the second transmission burst comprise a unicast physical downlink shared channel (PDSCH).

5. The method of claim 1, wherein the more than two pieces of first indication information are used for determining the same second transmission burst in the COT.

6. The method of claim 1, wherein the method further comprises:
receiving, by the terminal device, the downlink transmission from the network device within the second transmission burst.

7. A communication device for wireless communication on an unlicensed spectrum, wherein the communication device is a terminal device, and the communication device comprising:
a transceiver;
a processor; and
a memory, wherein the memory is configured to store a computer program that, when executed by the processor, causes the communication device to:
send more than two pieces of first indication information to a network device in a first transmission burst in a channel occupancy time (COT) initiated by the terminal device;
wherein the more than two pieces of first indication information are used for determining: a starting location of a second transmission burst in the COT and a length of the second transmission burst in the COT, wherein the second transmission burst is shared with the network device to perform a downlink transmission;
wherein the length of the second transmission burst in the COT indicated by a first piece of first indication information is the same as the length of the second transmission burst in the COT indicated by a second piece of first indication information.

8. The communication device of claim 7, wherein the more than two pieces of first indication information are used for determining whether to share a resource in the COT initiated by the terminal device with the network device or not.

9. The communication device of claim 7, wherein the more than two pieces of first indication information are carried in uplink control information (UCI) of a configured-granted physical uplink shared channel (CG-PUSCH) in the first transmission burst.

10. The communication device of claim 7, wherein one or more channels transmitted in the second transmission burst comprise a unicast physical downlink shared channel (PDSCH).

11. The communication device of claim 7, wherein the more than two pieces of first indication information indicate the same second transmission burst in the COT.

12. The communication device of claim 7, wherein the memory is configured to store the computer program that, when executed by the processor, further causes the communication device to:
receive the downlink transmission from the network device within the second transmission burst.

13. A wireless communication method for an unlicensed spectrum, comprising:
receiving, by a network device, more than two pieces of first indication information sent by a terminal device in a first transmission burst in a channel occupancy time (COT) initiated by the terminal device;
wherein the more than two pieces of first indication information are used for determining: a starting location of a second transmission burst in the COT and a length of the second transmission burst in the COT;
performing, by the network device, a downlink transmission with the second transmission burst in accordance with the more than two pieces of first indication information;
wherein the length of the second transmission burst in the COT indicated by a first piece of first indication information is the same as the length of the second transmission burst in the COT indicated by a second piece of first indication information.

14. The method of claim 13, wherein the more than two pieces of first indication information are used for determining whether to share a resource in the COT initiated by the terminal device with the network device or not.

15. The method of claim 13, wherein one or more channels transmitted in the second transmission burst comprise a unicast physical downlink shared channel (PDSCH).

16. The method of claim 13, wherein the more than two pieces of first indication information are received in uplink control information (UCI) of a configured-granted physical uplink shared channel (CG-PUSCH) in the first transmission burst.

17. The method of claim 13, wherein the second transmission burst is a transmission burst transmitted by the network device to a second terminal device or the terminal device.

18. A communication device for wireless communication on an unlicensed spectrum, wherein the communication device is a network device, and the communication device comprising:
- a transceiver;
- a processor; and
- a memory, wherein the memory is configured to store a computer program that, when executed by the processor, causes the communication device to:
- receive more than two pieces of first indication information sent by a terminal device in a first transmission burst in a channel occupancy time (COT) initiated by the terminal device;
- wherein the more than two pieces of first indication information are used for determining: a starting location of a second transmission burst in the COT and a length of the second transmission burst in the COT;
- perform a downlink transmission with the second transmission burst in accordance with the more than two pieces of first indication information;
- wherein the length of the second transmission burst in the COT indicated by a first piece of first indication information is the same as the length of the second transmission burst in the COT indicated by a second piece of first indication information.

19. The communication device of claim 18, wherein the more than two pieces of first indication information are used for determining whether to share a resource in the COT initiated by the terminal device with the network device or not.

20. The communication device of claim 18, wherein one or more channels transmitted in the second transmission burst comprise a unicast physical downlink shared channel (PDSCH).

21. The communication device of claim 18, wherein the more than two pieces of first indication information are received in uplink control information (UCI) of a configured-granted physical uplink shared channel (CG-PUSCH) in the first transmission burst.

22. The communication device of claim 18, wherein the second transmission burst is a transmission burst transmitted by the network device to a second terminal device or the terminal device.

* * * * *